US012380871B2

(12) United States Patent
Slaibi et al.

(10) Patent No.: US 12,380,871 B2
(45) Date of Patent: Aug. 5, 2025

(54) SYSTEM, APPARATUS, AND METHOD FOR RECORDING SOUND

(71) Applicant: Band Industries Holding SAL, Beirut (LB)

(72) Inventors: Hassane Slaibi, Rayak (LB); Bassam Jalgha, Hazmieh (LB)

(73) Assignee: Band Industries Holding SAL, Beirut (LB)

( * ) Notice: Subject to any disclaimer, the term of this patent is extended or adjusted under 35 U.S.C. 154(b) by 350 days.

(21) Appl. No.: 18/157,513

(22) Filed: Jan. 20, 2023

(65) Prior Publication Data

US 2023/0237983 A1 Jul. 27, 2023

Related U.S. Application Data

(60) Provisional application No. 63/301,859, filed on Jan. 21, 2022.

(51) Int. Cl.
*G10H 3/14* (2006.01)
*H04R 1/46* (2006.01)

(52) U.S. Cl.
CPC ............... *G10H 3/146* (2013.01); *H04R 1/46* (2013.01)

(58) Field of Classification Search
CPC ................................. H04R 1/46; G10H 3/146
See application file for complete search history.

(56) References Cited

U.S. PATENT DOCUMENTS 3,813,983 A 6/1974 Paul
4,088,052 A 5/1978 Hedrick
4,365,537 A 12/1982 Pogoda
4,523,506 A 6/1985 Hollimon
4,630,304 A 12/1986 Borth et al.
4,889,029 A 12/1989 Denis
4,899,636 A 2/1990 Chiba
5,092,216 A 3/1992 Wadhams
5,381,473 A 1/1995 Andrea et al.
5,390,579 A 2/1995 Burgon
5,528,970 A 6/1996 Zacaroli
5,659,662 A 8/1997 Wilcox et al.
5,767,429 A 6/1998 Milano
5,828,760 A 10/1998 Jacobson et al.
5,862,234 A 1/1999 Todter
(Continued)

FOREIGN PATENT DOCUMENTS

AU 2005297317 B2 11/2010
CN 201117233 9/2008
(Continued)

OTHER PUBLICATIONS

Weissensteiner, et al . . . Motorized Guitar Tuner, Bachelor Thesis Telematics, Mar. 26, 2012, University of Technology, Graz, Austria.

*Primary Examiner* — Sunita Joshi

(74) *Attorney, Agent, or Firm* — Fox Rothschild LLP

(57) ABSTRACT

An apparatus for recording sound of an instrument is disclosed. The apparatus has a contact microphone configured to contact the instrument, and an ambient microphone. The ambient microphone is configured to record ambient sound at a location of the instrument as a first signal or data. The contact microphone is insensitive to air vibrations and is configured to record vibrations of the instrument as a second signal or data.

21 Claims, 10 Drawing Sheets

(56) References Cited

U.S. PATENT DOCUMENTS

| | | | |
|---|---|---|---|
| 5,886,270 | A | 3/1999 | Wynn |
| 5,952,597 | A | 9/1999 | Weinstock et al. |
| 5,990,403 | A | 11/1999 | Membreno |
| 6,066,791 | A | 5/2000 | Renard et al. |
| 6,072,113 | A | 6/2000 | Tohgi et al. |
| 6,108,415 | A | 8/2000 | Andrea |
| 6,166,314 | A | 12/2000 | Weinstock et al. |
| 6,211,451 | B1 | 4/2001 | Tohgi et al. |
| 6,294,719 | B1 | 9/2001 | Palecki |
| 6,385,323 | B1 | 5/2002 | Zoels |
| 6,437,226 | B2 | 8/2002 | Oudshoorn |
| 6,452,081 | B1 | 9/2002 | Ravagni |
| 6,465,723 | B2 | 10/2002 | Milano |
| 6,495,747 | B2 | 12/2002 | Shimaya et al. |
| 6,784,353 | B1 | 8/2004 | Davis |
| 6,799,170 | B2 | 9/2004 | Lee et al. |
| 6,934,383 | B2 | 8/2005 | Kim |
| 7,049,502 | B2 | 5/2006 | Taku |
| 7,054,816 | B2 | 5/2006 | Aarts et al. |
| 7,129,407 | B2 | 10/2006 | Hiratsuka et al. |
| 7,315,623 | B2 | 1/2008 | Gierl et al. |
| 7,337,115 | B2 | 2/2008 | Liu et al. |
| 7,446,248 | B2 | 11/2008 | Skinn |
| 7,464,029 | B2 | 12/2008 | Visser et al. |
| 7,561,700 | B1 | 7/2009 | Bernardi et al. |
| 7,659,466 | B1 | 2/2010 | Jang |
| 7,663,044 | B2 | 2/2010 | Katsuta |
| 7,707,028 | B2 | 4/2010 | Kojima |
| 8,253,002 | B2 | 8/2012 | Christmas |
| 8,367,921 | B2 | 2/2013 | Evans et al. |
| 8,927,838 | B2 | 1/2015 | Jalgha |
| 8,986,090 | B2 | 3/2015 | Epstein |
| 9,092,992 | B2 | 7/2015 | Yung |
| 9,202,455 | B2 | 12/2015 | Park et al. |
| 9,584,946 | B1 | 2/2017 | Lyren |
| 9,595,252 | B2 | 3/2017 | Asada et al. |
| 9,601,098 | B2 | 3/2017 | Black Hawk |
| 9,805,725 | B2 | 10/2017 | Crockett et al. |
| 9,817,635 | B1 | 11/2017 | Ledet |
| 9,955,250 | B2 | 4/2018 | Hendrix et al. |
| 10,026,388 | B2 | 7/2018 | Lu et al. |
| 10,176,826 | B2 | 1/2019 | Wang |
| 10,199,029 | B2 | 2/2019 | Hsu et al. |
| 10,249,284 | B2 | 4/2019 | Kwatra et al. |
| 10,867,621 | B2 | 12/2020 | Khoury et al. |
| 2002/0005109 | A1 | 1/2002 | Miller |
| 2004/0182224 | A1 | 9/2004 | Catalano |
| 2005/0087060 | A1 | 4/2005 | Taku |
| 2005/0276421 | A1 | 12/2005 | Bergeron et al. |
| 2005/0281415 | A1 | 12/2005 | Lambert |
| 2006/0042455 | A1 | 3/2006 | Schatten |
| 2006/0069556 | A1 | 3/2006 | Nadjar |
| 2006/0090626 | A1 | 5/2006 | Harrison |
| 2006/0196343 | A1 | 9/2006 | Yung |
| 2007/0238490 | A1 | 10/2007 | Myrberg et al. |
| 2007/0243513 | A1 | 10/2007 | Ohshima et al. |
| 2008/0004872 | A1 | 1/2008 | Nordholm et al. |
| 2008/0019548 | A1 | 1/2008 | Avendano |
| 2008/0152167 | A1 | 6/2008 | Taenzer |
| 2008/0201138 | A1 | 8/2008 | Visser et al. |
| 2008/0215318 | A1 | 9/2008 | Zhang et al. |
| 2009/0006102 | A1 | 1/2009 | Kan et al. |
| 2009/0034748 | A1 | 2/2009 | Sibbald |
| 2009/0074199 | A1 | 3/2009 | Kierstein et al. |
| 2009/0111507 | A1 | 4/2009 | Chen |
| 2009/0170550 | A1 | 7/2009 | Foley |
| 2009/0254338 | A1 | 10/2009 | Chan et al. |
| 2010/0081487 | A1* | 4/2010 | Chen ..................... H04M 1/605 455/575.1 |
| 2010/0125352 | A1 | 5/2010 | Yamada et al. |
| 2011/0282658 | A1 | 11/2011 | Wang et al. |
| 2011/0288860 | A1 | 11/2011 | Schevciw et al. |
| 2012/0045066 | A1 | 2/2012 | Nakadai et al. |
| 2014/0260903 | A1* | 9/2014 | Stok ..................... G09B 15/002 84/477 R |
| 2015/0047493 | A1 | 2/2015 | Leadbetter |
| 2015/0057512 | A1 | 2/2015 | Kapoor |
| 2016/0267895 | A1* | 9/2016 | Jeon ....................... G10H 3/181 |
| 2016/0372097 | A1 | 12/2016 | Rogers |
| 2018/0262832 | A1 | 9/2018 | Grosche et al. |
| 2018/0277069 | A1* | 9/2018 | Jalgha ...................... G10D 3/14 |
| 2019/0074030 | A1 | 3/2019 | Omachi |
| 2019/0180726 | A1 | 6/2019 | Shriki |

FOREIGN PATENT DOCUMENTS

| | | | |
|---|---|---|---|
| CN | 106952644 | A | 7/2017 |
| EP | 1124218 | A1 | 8/2001 |
| JP | H0619387 | A | 1/1994 |
| JP | 2002189476 | A | 7/2002 |
| JP | 2003078987 | A | 3/2003 |
| KR | 101035027 | | 5/2011 |
| WO | 1997025790 | A2 | 7/1997 |
| WO | 2013007218 | A1 | 1/2013 |
| WO | 2017120043 | A1 | 7/2017 |

* cited by examiner

SYSTEM, APPARATUS, AND METHOD FOR RECORDING SOUND

RELATED APPLICATIONS

This application claims the benefit of U.S. Provisional Patent Application No. 63/301,859 filed Jan. 21, 2022, which is hereby incorporated by reference in its entirety.

TECHNICAL FIELD

The present disclosure generally relates to a system, apparatus, and method for recording, and more particularly to a system, apparatus, and method for recording sound.

BACKGROUND

Devices that produce sound such as musical instruments are often used in conjunction with other instruments, other devices that produce sound, and/or in environments including significant ambient noise. For example, a musical instrument is often used to produce music in relatively noisy environments such as music venues and alongside other noise-producing instruments and devices.

Because sound-producing devices are often used in relatively noisy environments or alongside other noise-producing devices, it is typically difficult to evaluate sound produced by one device individually or to tune an individual device. For example, it is typically difficult to evaluate and measure sound produced by a single musical instrument in view of other musical instruments being played in a relatively noisy environment.

Conventional systems do not provide an efficient and effective technique for evaluating sound produced by an individual device in a relatively noisy environment. Conventional systems also do not provide an efficient and effective technique for evaluating sound produced by an individual device when used in conjunction with other sound-producing devices.

The exemplary disclosed system, apparatus, and method are directed to overcoming one or more of the shortcomings set forth above and/or other deficiencies in existing technology.

SUMMARY OF THE DISCLOSURE

In one exemplary aspect, the present disclosure is directed to an apparatus for recording sound of an instrument. The apparatus includes a contact microphone configured to contact the instrument, and an ambient microphone. The ambient microphone is configured to record ambient sound at a location of the instrument as a first signal or data. The contact microphone is insensitive to air vibrations and is configured to record vibrations of the instrument as a second signal or data.

In another aspect, the present disclosure is directed to a method for recording sound of an instrument. The method includes recording ambient sound at a location of the instrument as a first signal or data using an ambient microphone, contacting the instrument with a contact microphone that is insensitive to air vibrations, recording vibrations of the instrument as a second signal or data using the contact microphone contacting the instrument while recording the ambient sound using the ambient microphone, and determining a sound track based on suppressing the second signal or data from the first signal or data using a controller.

DETAILED DESCRIPTION AND INDUSTRIAL APPLICABILITY

Figure 1:
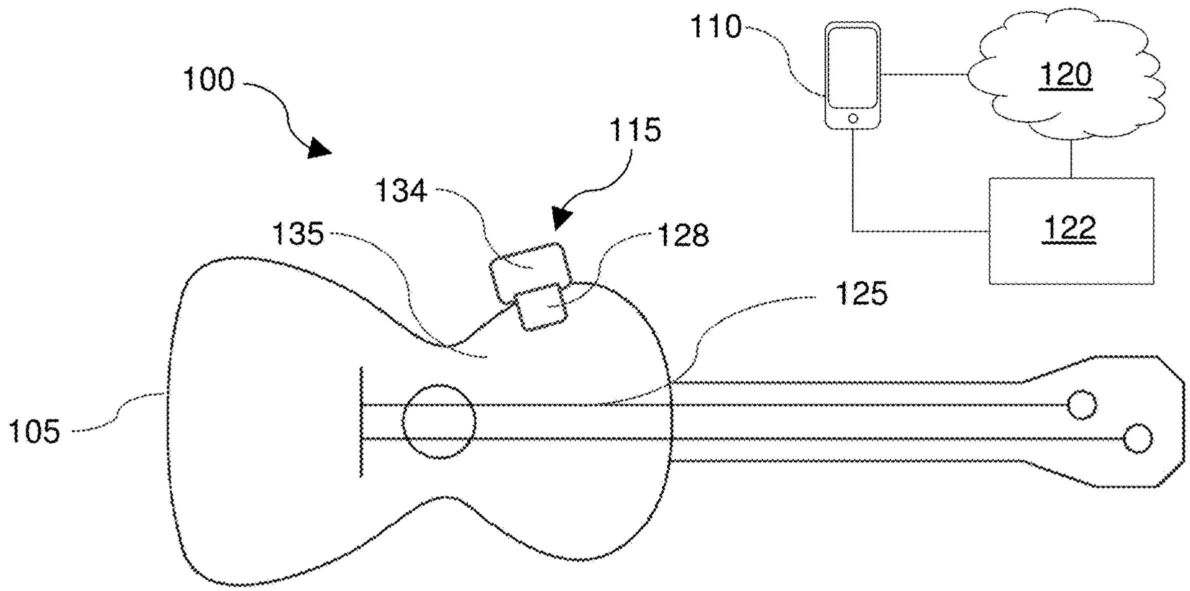
FIG. 1 illustrates a side view of at least some exemplary embodiments of the present disclosure.

The exemplary disclosed system, apparatus, and method may include a recording and training system and device. For example, the exemplary disclosed system, apparatus, and method may include an attachable musical instrument recording and music training device. The exemplary disclosed method may include deriving a third audio signal from two input audio signals. In at least some exemplary embodiments and as illustrated in FIG. 1, the exemplary disclosed system, apparatus, and method may include a system 100. System 100 may include an apparatus 115 that may be removably attached to an instrument 105. Apparatus 115 may record sound produced by instrument 105. System 100 may also include one or more user devices 110 and/or one or more sensors 122. Apparatus 115, user device 110, instrument 105, and/or sensor 122 may communicate directly with each other and/or may communicate with each other via a network 120 using any suitable communication technique for example as described herein.

User device 110 may be any suitable user device for receiving input and/or providing output (e.g., raw data or other desired information) to a user. User device 110 may be, for example, a touchscreen device (e.g., of a smartphone, a tablet, a smartboard, and/or any suitable computer device), a computer keyboard and monitor (e.g., desktop or laptop), an audio-based device for entering input and/or receiving output via sound, a tactile-based device for entering input and receiving output based on touch or feel, a dedicated user device or interface designed to work specifically with other components of system 100, and/or any other suitable user device or interface. For example, user device 110 may include a touchscreen device of a smartphone or handheld tablet. For example, user device 110 may include a display that may include a graphical user interface to facilitate entry of input by a user and/or receiving output. For example, system 100 may provide information, data, and/or notifications to a user via output transmitted to user device 110. User device 110 may communicate with components of apparatus 115 by any suitable technique such as, for example, as described below.

Instrument 105 may be any suitable device for producing sound. For example, instrument 105 may be a musical instrument. Instrument 105 may be a string musical instrument, a woodwind musical instrument, a keyboard musical instrument, a brass musical instrument, or a percussion musical instrument. In at least some exemplary embodiments, instrument 105 may be an acoustic guitar, an electric guitar, or a ukulele. Instrument 105 may include vocal chords of a user. Instrument 105 may be a non-musical instrument that may produce sound such as, for example, a siren, a speaker, an audio noise generator, a vibration device, or any other desired device for generating sound.

One or more sensors 122 may be any suitable sensors for sensing data associated with an operation of instrument 105 such as sound produced by instrument 105, movement and/or actuation of components (e.g., an instrument component 125 such as a guitar string or any other suitable component) of instrument 105, movement and/or actions of a user operating instrument 105, an operation, movement, and/or position of apparatus 115, and/or any other desired parameter. Sensor 122 may be a separate unit from apparatus 115 or may be integrated into apparatus 115 and/or user device 110. Sensor 122 may be disposed at and/or attached to instrument 105 or disposed at any desired position relative to instrument 105. One or more sensors 122 may include an imaging device such as a camera. For example, sensor 122 may include a camera (e.g., a video camera) that may record actions of an operator of instrument 105 (e.g., a performance of a musician playing instrument 105 that may be a musical instrument). For example, sensor 122 may include any suitable video camera such as a digital video camera, a webcam, and/or any other suitable camera for recording visual data (e.g., recording a video and/or taking pictures). Sensor 122 may include for example a three-dimensional video sensor or camera. One or more sensors 122 may include a plurality of cameras (e.g., a set of cameras) or a single camera configured to collect three-dimensional image data. In at least some exemplary embodiments, sensor 122 may include a stereoscopic camera and/or any other suitable device for stereo photography, stereo videography, and/or stereoscopic vision. Sensor 122 may measure position, velocity (e.g., angular velocity), orientation, acceleration, and/or any other desired position and/or motion of components of instrument 105. Sensor 122 may include a gyrometer or gyroscope. Sensor 122 may be any suitable distance sensor such as, for example, a laser distance sensor, an ultrasonic distance sensor, an IR sensor, and/or any other suitable sensor. For example, sensor 122 may be any suitable sensor for sensing data based on which a sound (e.g., pitch and/or effects) produced by instrument 105 may be altered. Sensor 122 may include a displacement sensor, a velocity sensor, and/or an accelerometer. For example, sensor 122 may include components such as a servo accelerometer, a piezoelectric accelerometer, a potentiometric accelerometer, and/or a strain gauge accelerometer. Sensor 122 may include a piezoelectric velocity sensor or any other suitable type of velocity or acceleration sensor.

Network 120 may be any suitable communication network over which data may be transferred between one or more apparatuses 115, user devices 110, instruments 105, and/or sensors 122. Network 120 may be the internet, a LAN (e.g., via Ethernet LAN), a WAN, a WiFi network, or any other suitable network. Network 120 may be similar to WAN 1201 described below. The components of system 100 may also be directly connected (e.g., by wire, cable, USB connection, and/or any other suitable electro-mechanical connection) to each other and/or connected via network 120. For example, components of system 100 may wirelessly transmit data by any suitable technique such as, e.g., wirelessly transmitting data via 4G LTE networks (e.g., or 5G networks) or any other suitable data transmission technique for example via network communication. Components of system 100 may transfer data via the exemplary techniques described below regarding FIG. 14. One or more apparatuses 115, user devices 110, instruments 105, and/or sensors 122 may include any suitable communication components for communicating with other components of system 100 using for example the communication techniques described herein. For example, one or more apparatuses 115, user devices 110, instruments 105, and/or sensors 122 may include integrally formed communication devices that may communicate using any of the exemplary disclosed communication techniques.

In at least some exemplary embodiments, the exemplary disclosed components of system 100 may communicate via any suitable short distance communication technique. For example, one or more apparatuses 115, user devices 110, instruments 105, and/or sensors 122 may communicate via WiFi, Bluetooth, ZigBee, NFC, IrDA, and/or any other suitable short distance technique. One or more apparatuses 115, user devices 110, instruments 105, and/or sensors 122 may communicate through short distance wireless communication. An application (e.g., operating using the exemplary disclosed modules) may be installed on apparatus 115, network 120, instrument 105, and/or user device 110 and configured to send and receive commands (e.g., via input to user device 110 and/or the exemplary disclosed user interfaces).

System 100 may include one or modules for performing the exemplary disclosed operations. The one or more modules may include an accessory control module for controlling one or more apparatuses 115, user devices 110, instruments 105, and/or sensors 122. The one or more modules may be stored and operated by any suitable components of system 100 (e.g., including processor components) such as, for example, one or more apparatuses 115, user devices 110, instruments 105, and/or sensors 122, and/or any other suitable components of system 100. For example, system 100 may include one or more modules having computer-executable code stored in non-volatile memory. System 100 may also include one or more storages (e.g., buffer storages) that may include components similar to the exemplary disclosed computing device and network components described below regarding FIGS. 13 and 14. For example, the exemplary disclosed buffer storage may include components similar to the exemplary storage medium and RAM described below regarding FIG. 13. The exemplary disclosed buffer storage may be implemented in software and/or a fixed memory location in hardware of system 100. The exemplary disclosed buffer storage (e.g., a data buffer) may store data temporarily during an operation of system 100.

As illustrated in FIGS. 2-8, apparatus 115 may include an attachment assembly 128, a control assembly 130, and a recording assembly 132. Attachment assembly 128 may removably attach control assembly 130 and recording assembly 132 to instrument 105.

Structural components of apparatus 115 may be formed from any suitable structural materials such as, for example, plastic, metal (e.g., steel material such as stainless steel), ceramic, natural or synthetic rubber or elastomeric material, composite material, and/or any other suitable structural material. For example, a housing 134 of apparatus 115, in which control assembly 130 may be disposed and/or attached and to which attachment assembly 128 and/or recording assembly 132 may be attached, may be formed from structural plastic material.

Figure 2:
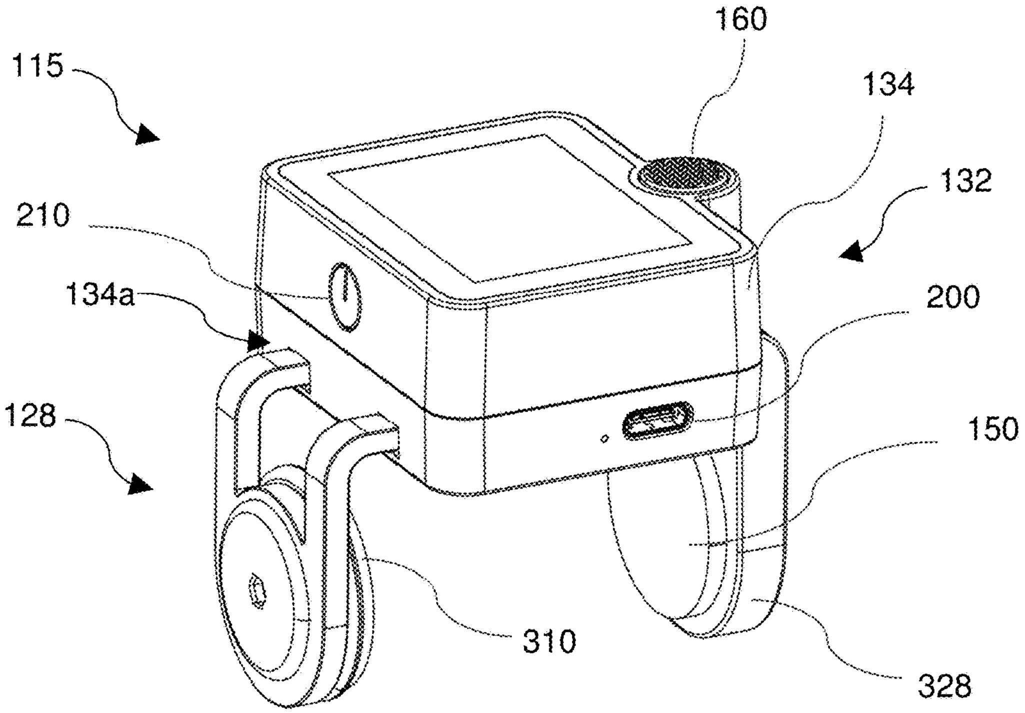
FIG. 2 illustrates a perspective view of at least some exemplary embodiments of the present disclosure.
Figure 3:
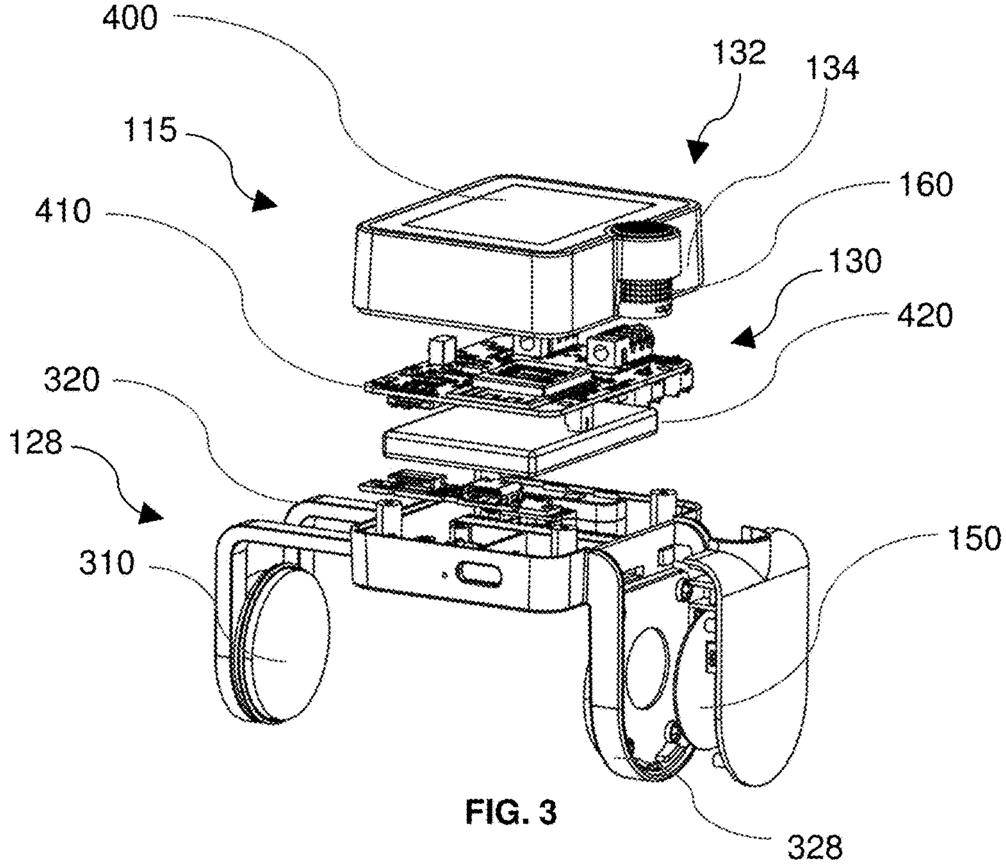
FIG. 3 illustrates a perspective, exploded view of at least some exemplary embodiments of the present disclosure.
Figure 4A:
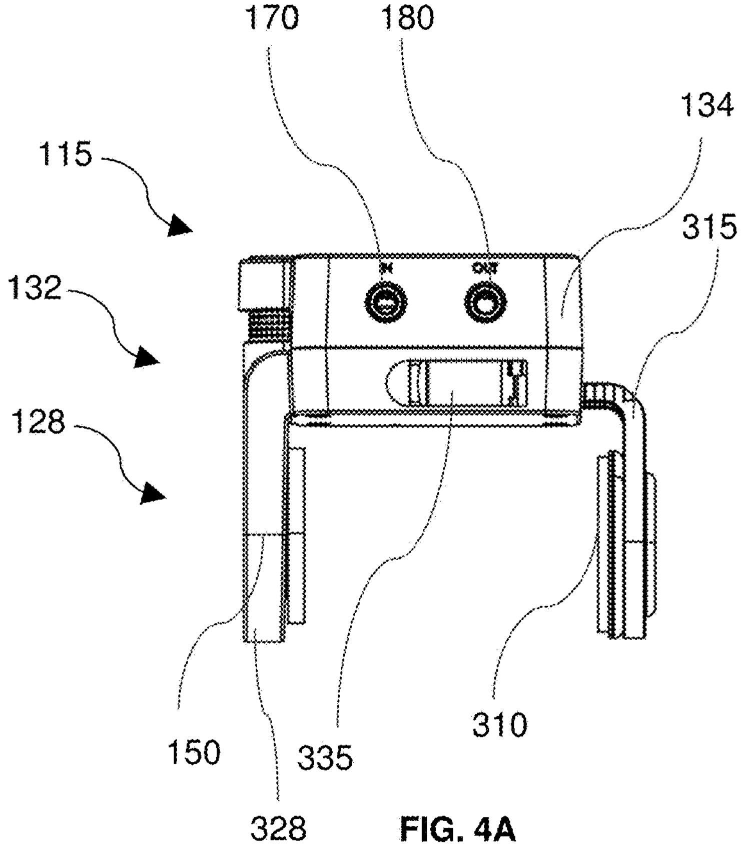
FIG. 4A illustrates a side view of at least some exemplary embodiments of the present disclosure.
Figure 4B:
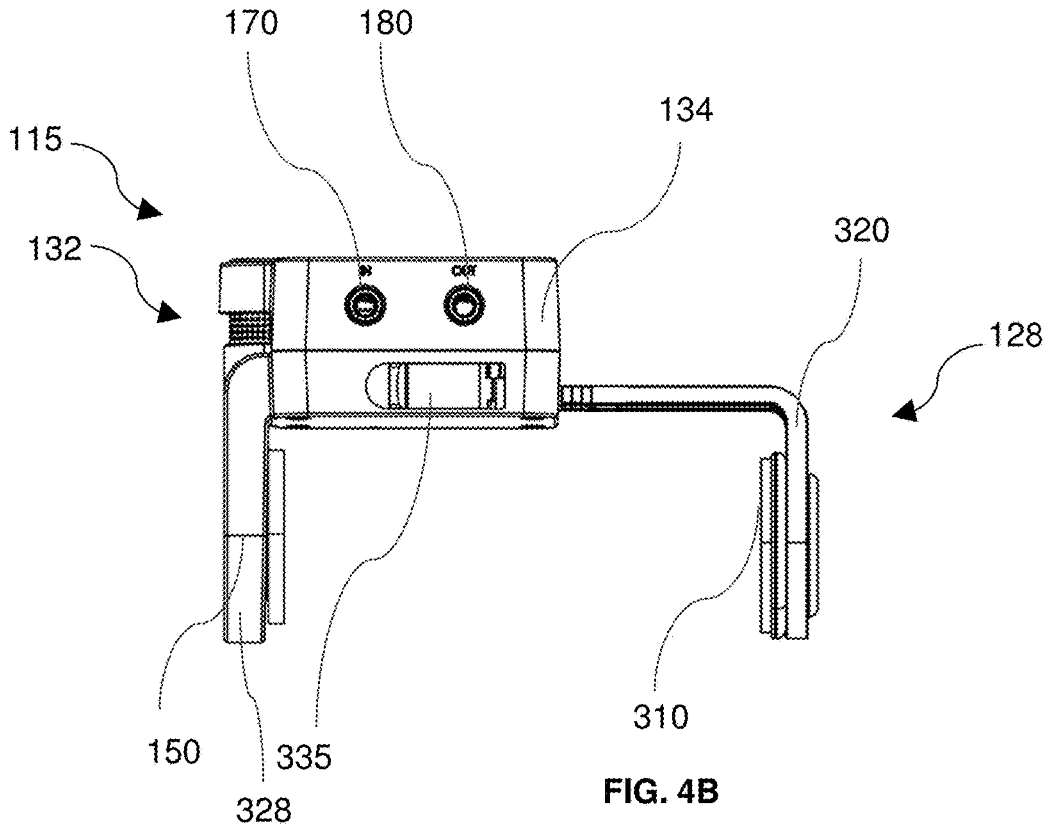
FIG. 4B illustrates a side view of at least some exemplary embodiments of the present disclosure.
Figure 4C:
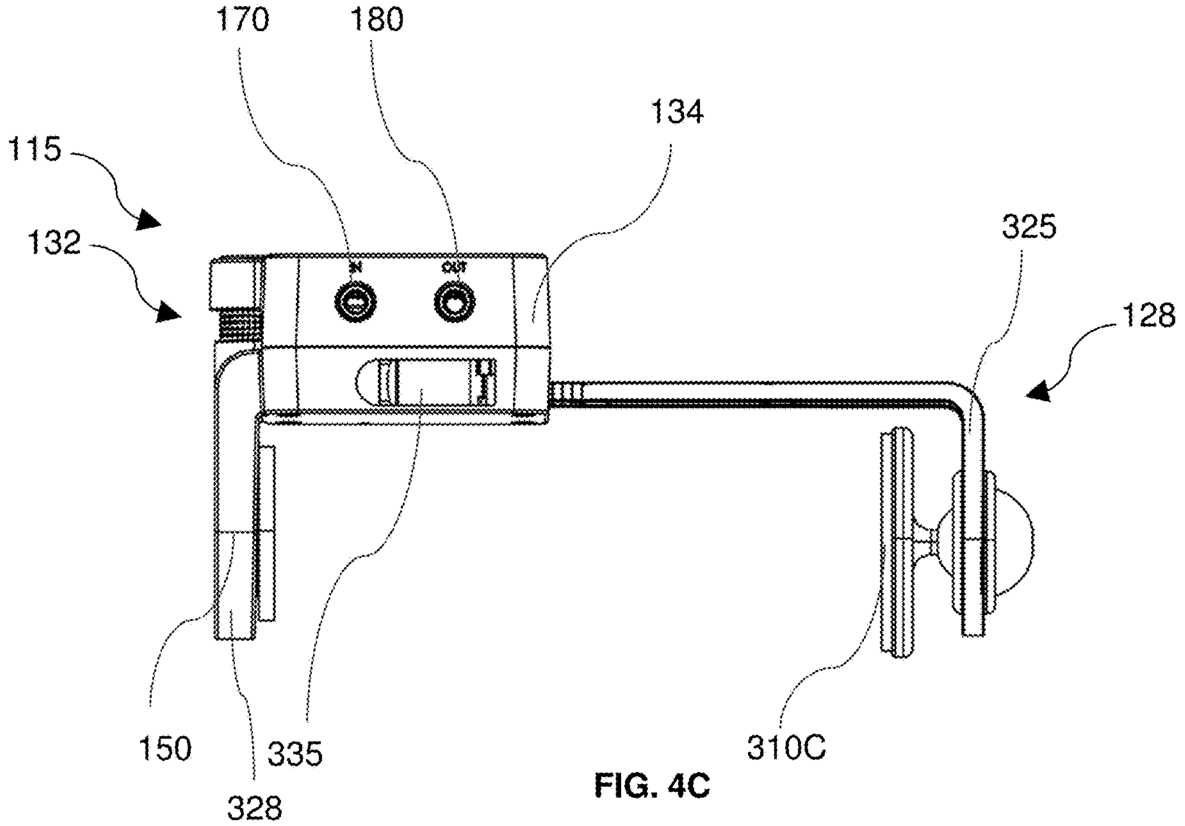
FIG. 4C illustrates a side view of at least some exemplary embodiments of the present disclosure.

As illustrated in FIG. 3, control assembly 130 may include a controller 410 and a power source 420 that may be disposed at and/or attached to housing 134. Controller 410 may be powered by power source 420. An operation of power source 420 and controller 410 may be started and stopped based on actuation of a power control 210 (e.g., a power button or any other suitable control component) for example as illustrated in FIG. 2. Controller 410 may operate using the exemplary disclosed module and may communicate with the other exemplary disclosed components of system 100 (e.g., user device 110, instrument 105, sensor 122, and/or network 120) using the exemplary disclosed communication techniques. Data associated with apparatus 115 may be displayed to a user via a user interface 400 that may be communicatively connected to controller 410. Power source 420 may be selectively charged via a charging port 200, which may be any suitable port for electrical charging such as, for example, USB type C, type A, type B, micro-USB, and/or any other suitable port for electrical charging.

Control assembly 130 may also include a line-in jack 170 and a line-out jack 180 that may be used to electrically and/or communicatively couple controller 410 to instrument 105 and/or audio devices (e.g., headphones) of a user of apparatus 115. For example, line-in jack 170 (e.g., an audio-in jack) may be used when instrument 105 may be an electrical instrument such as an electric guitar or other suitable pickup-equipped instruments, external microphones, and/or other sound-producing device that the user may wish to record. For example, line-in jack 170 may be used for recording input from instrument 105 via an operation of controller 410. Line-out jack 180 may be connected to an audio device of the user of system 100 (e.g., headphones) to perform a sound check (e.g., quick headphone sound check) on audio levels, listen to on-board recordings, and/or any other suitable use (e.g., serving as a Micro Amp). For example, apparatus 115 may be used as a Micro Amp to practice instrument 105 that may be an electric instrument (e.g., electric guitar) without use of an amplifier and without making any noise via connection to line-out jack 180. Line-out jack 180 may also be used for plugging into an amplifier so that the exemplary disclosed contact microphone of recording assembly 132 may serve as a contact microphone for live performances. In at least some exemplary embodiments, line-in jack 170 and line-out jack 180 may be ⅛ inch (3.5 mm) jacks (e.g., or any other suitable size).

User interface 400 may include components similar to user device 110. User interface 400 may include components similar to the exemplary disclosed user interface described below for example regarding FIGS. 11A-11E, 13, and 14. User interface 400 may include any suitable display assembly. For example, user interface 400 may include a touchscreen display, light-emitting diodes (LEDs), organic light-emitting diodes (OLED), electroluminescent lighting elements (ELs), and/or any other suitable lighting elements. User interface 400 may include a display assembly that may display any suitable patterns, colors, text displays, symbols, and/or any other display of desired data output to a user regarding an operation of apparatus 115 (e.g., and/or emit an audio output). User interface 400 may also include one or more actuators (e.g., buttons, sliders, dials, capacitive touch elements, and/or any other suitable actuators that may be used by a user to adjust settings and/or control apparatus 115). User interface 400 may also include a touch surface that allows a user to individually adjust components (e.g., microphones) of recording assembly 132. User interface 400 may include an LED touch interface.

Controller 410 may control an operation of apparatus 115. Controller 410 may include for example a processor (e.g., micro-processing logic control device), board components, and/or a PCB. Also for example, controller 410 may include input/output arrangements that allow it to be connected (e.g., via wireless, Wi-Fi, Bluetooth, or any other suitable communication technique) to other components of system 100. For example, controller 410 may control an operation of apparatus 115 based on input received from an exemplary disclosed module of system 100 (e.g., as described below), user device 110, network 120, sensor 122, instrument 105, and/or input provided directly to user interface 400 by a user. Controller 410 may communicate with components of system 100 via wireless communication, Wi-Fi, Bluetooth, network communication, internet, and/or any other suitable technique (e.g., as disclosed herein). Controller 410 may be communicatively coupled with, exchange input and/or output with, and/or control any suitable component of apparatus 115 and/or system 100.

Power source 420 may be any suitable power source for powering apparatus 115. Power source 420 may be a power storage. Power source 420 may be a battery. Power source 420 may be a rechargeable battery. In at least some exemplary embodiments, power source 420 may include a nickel-metal hydride battery, a lithium-ion battery, an ultracapacitor battery, a lead-acid battery, and/or a nickel cadmium battery. In at least some exemplary embodiments, power source 420 may be a USB-C battery. In at least some exemplary embodiments, power source 420 may include any suitable USB-C device such as, for example, a 100 W USB-C cable converted and connected to an AC wall outlet or a DC car outlet. Power source 420 may be electrically connected to exemplary disclosed electrical components of apparatus 115 for example as described below via a connector such as an electrical cable, cord, or any other suitable electrical connector. Power source 420 may provide a continuous electrical output to controller 410 and/or other electrical components of apparatus 115.

Figure 5:
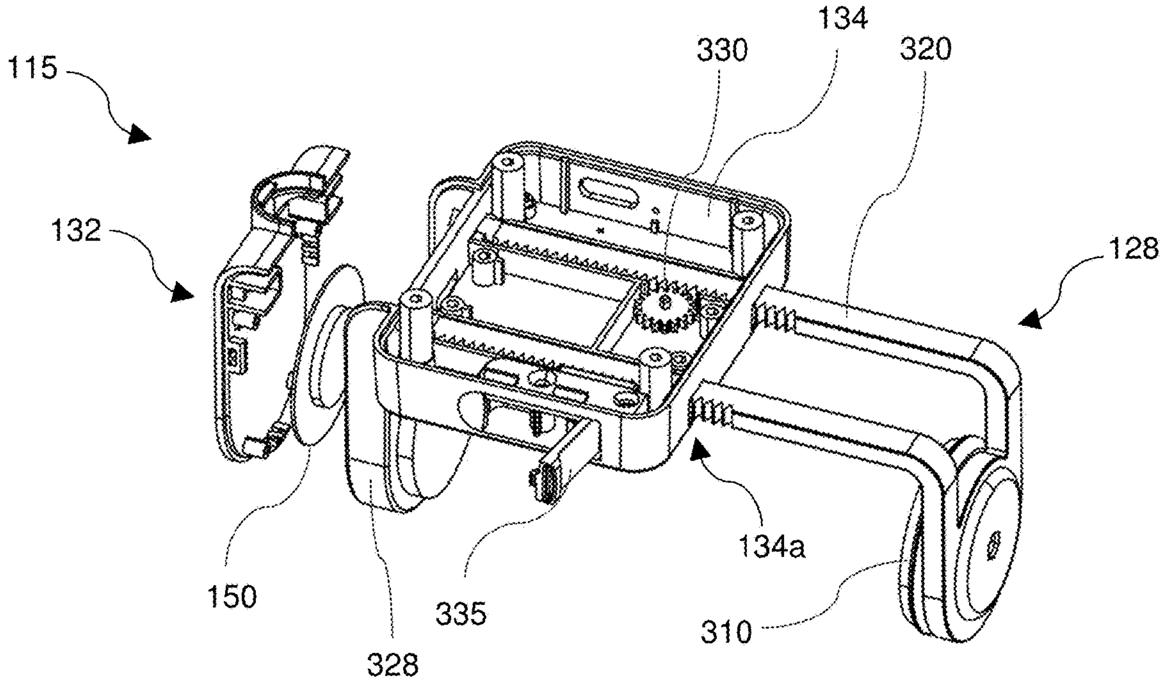
FIG. 5 illustrates a perspective, exploded view of at least some exemplary embodiments of the present disclosure.
Figure 6:
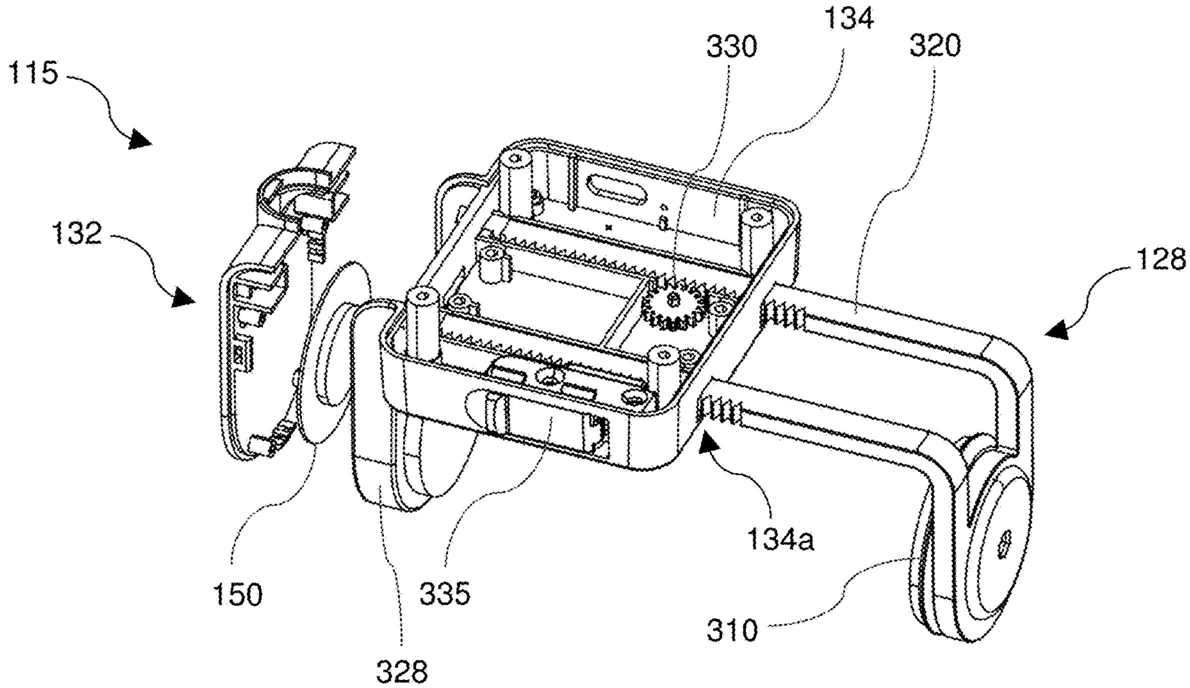
FIG. 6 illustrates a perspective, exploded view of at least some exemplary embodiments of the present disclosure.
Figure 7:
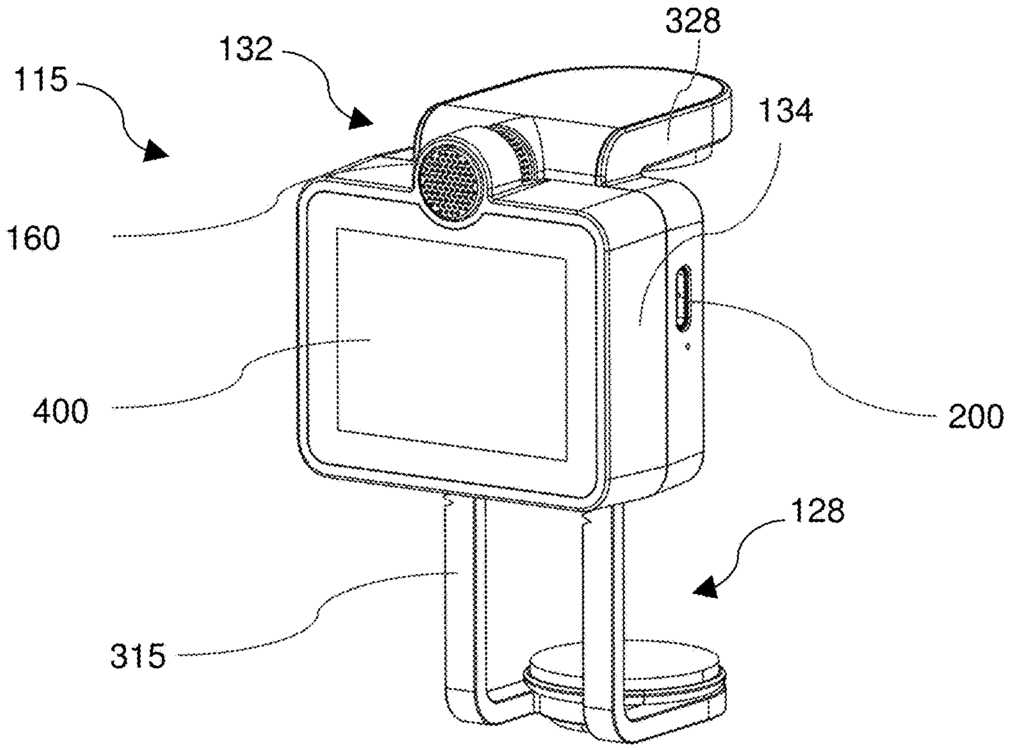
FIG. 7 illustrates a perspective view of at least some exemplary embodiments of the present disclosure.
Figure 8:
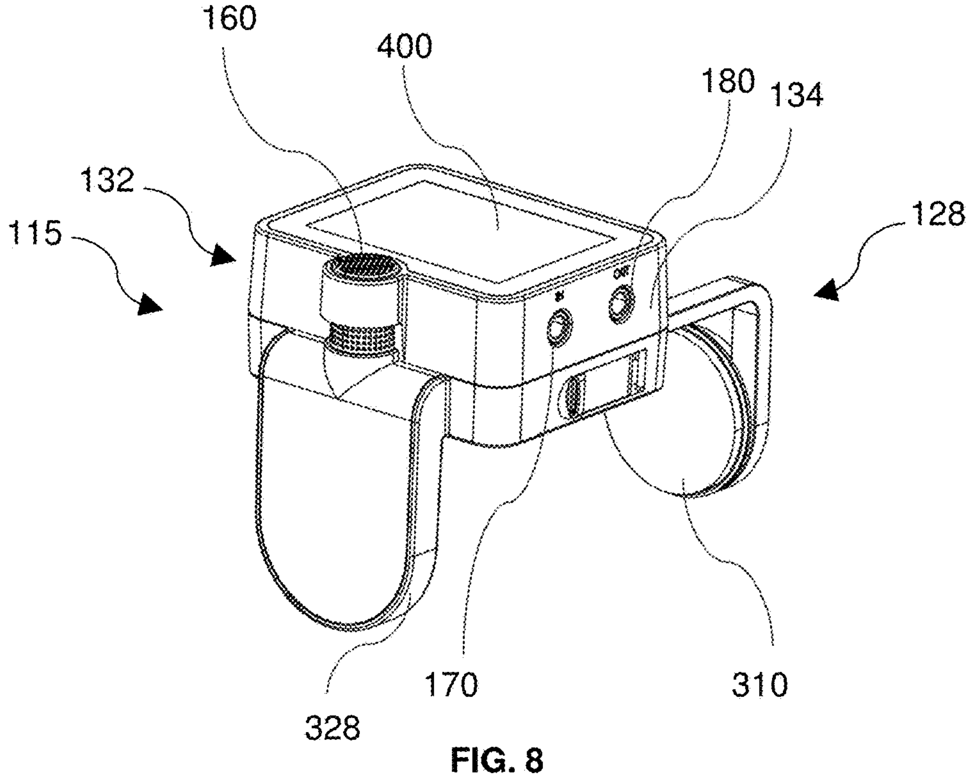
FIG. 8 illustrates a perspective view of at least some exemplary embodiments of the present disclosure.

Attachment assembly 128 may provide for removable attachment (e.g., or substantially permanent attachment) of apparatus 115 to instrument 105. Attachment assembly 128 may include one or more mounting arms that may be removably and/or movably received through apertures **134*a*** of housing 134 for example as illustrated in FIGS. 2, 5, and 6. For example, attachment assembly 128 may include mounting arms 315, 320, and/or 325, which may be mounting arms of differing lengths (e.g., mounting arm 325 may be longer than mounting arm 320, and mounting arm 320 may be longer than mounting arm 315). A given mounting arm 315, 320, or 325 may be used depending on a thickness or width of a component of instrument 105 about which attachment assembly 128 may be fastened. For example, mounting arm 315 may be utilized for fastening to or about a relatively thinner component of instrument 105, mounting arm 325 may be utilized for fastening to or about a relatively thicker or wider component of instrument 105, and mounting arm 320 may be used for fastening to or about a middle-sized or medium-sized component of instrument 105. For example as illustrated in FIG. 1, attachment assembly 128 may attach apparatus 115 to instrument 105 (e.g., at a soundboard 135 of instrument 105 that may be a guitar). Attachment assembly 128 may be attached to instrument 105 based on an attachment member 310 of mounting arm 315 or 320 or an attachment member 310C of mounting arm 325 contacting a first portion of a component of instrument 105, and an attachment arm 328 of attachment assembly 128 contacting a second portion of the component of instrument 105 (e.g., so that attachment assembly 128 is fastened about the component of instrument 105 for example as illustrated in FIG. 1). Also in at least some exemplary embodiments, attachment member 310C and/or attachment member 310 may be attached to any of mounting arms 315, 320, and 325.

As illustrated in FIGS. 5 and 6, attachment assembly 128 may include a gear assembly 330 and a lock assembly 335 that may operate to produce an attachment force (e.g., tension) for maintaining an attachment of apparatus 115 to instrument 105 and locking attachment assembly 128 in a position to maintain the attachment force. When attachment assembly 128 is positioned around a portion of instrument 105, the exemplary disclosed mounting arm (e.g., mounting arm 315, 320, or 325) may be moved closer to attachment arm 328 to close attachment assembly 128 around a desired portion of instrument 105. Members of the exemplary disclosed mounting arm may extend and pass through apertures 134*a* as the exemplary disclosed mounting arm moves. Gear assembly 330 may receive and guide portions of mounting arm 315, 320, or 325 as the mounting arm moves (e.g., via interlocking components such as teeth as illustrated in FIGS. 5 and 6, a track, a rack and pinion configuration, and/or any other suitable configuration for guiding a movement of mounting arm 315, 320, or 325 relative to apparatus 115). Gear assembly 330 may also apply force (e.g., exert tension or compression) to the exemplary disclosed mounting arm, which may maintain a position of apparatus 115 on instrument 105. Lock assembly 335 may be moved between the unlocked position illustrated in FIG. 5 and the locked position illustrated in FIG. 6. When lock assembly 335 is in the unlocked position illustrated in FIG. 5, portions of mounting arm 315, 320, or 325 may move through apertures 134*a*. When lock assembly 335 is in the locked position illustrated in FIG. 6, portions of mounting arm 315, 320, or 325 may be locked in place (e.g., by force exerted by lock assembly 335 on the exemplary disclosed mounting arm) and may not move relative to apertures 134*a* and housing 134. Lock assembly 335 may be moved from the unlocked position illustrated in FIG. 5 to the locked position illustrated in FIG. 6 when gear assembly 330 is applying force to the exemplary disclosed mounting arm so that attachment assembly 128 is locked in place while exerting an attachment force against instrument 105, which may maintain the attachment of apparatus 115 to instrument 105. For example, attachment assembly 128 may produce a force (e.g., tension or compression) that holds mounting arm 315, 320, or 325 in place so that apparatus 115 is locked in place on instrument 105. When desired, lock assembly 335 may be moved from the locked position illustrated in FIG. 6 to the unlocked position illustrated in FIG. 5 so that mounting arm 315, 320, or 325 may be moved away from attachment arm 328 (e.g., removing the force maintaining apparatus 115 on instrument 105), and apparatus 115 may be removed from instrument 105.

Recording assembly 132 may include a contact microphone 150 and an ambient microphone 160. Contact microphone 150 may be attached to attachment arm 328, and ambient microphone 160 may be attached to housing 134. Also for example, contact microphone 150 and/or ambient microphone 160 may be attached to any other suitable location of apparatus 115, or may be separate components that may communicate with the other exemplary disclosed components of system 100 via the exemplary disclosed communication techniques. In at least some exemplary embodiments, ambient microphone 160 may be a microphone of user device 110 or a stand-alone component disposed near instrument 105. A built-in speaker may also be included in apparatus 115 for playing sound using the exemplary disclosed recordings. For example, the built-in speaker may be integrated into housing 134 and/or controller 410.

Contact microphone 150 may be any suitable type of microphone for placing in direct contact with instrument 105. Contact microphone 150 may be any suitable type of microphone for transducing, detecting, recording, and/or sensing a vibration of instrument 105. Contact microphone 150 may be insensitive to air vibrations. Contact microphone 150 may be any suitable microphone for transducing vibrations that may occur in solid material. Contact microphone 150 may be any suitable microphone for transducing sound from a structure while being insensitive to air vibrations. Contact microphone 150 may be a piezo microphone. Contact microphone 150 may include a disk-shaped microphone including ceramic and/or metallic materials. Contact microphone 150 may include a piezoelectric transducer. When apparatus 115 is attached to instrument 105, contact microphone 150 may be in contact (e.g., direct contact) with a portion of instrument 105 (e.g., such as soundboard 135 of instrument 105 that may be a guitar). Contact microphone 150 may thereby transduce vibrations that occur in the solid material of instrument 105.

Ambient microphone 160 may be any suitable microphone for transducing, detecting, recording, and/or sensing substantially all ambient sound and/or vibrations in an area of ambient microphone 160. Ambient microphone 160 may be any suitable microphone for ambient miking. Ambient microphone 160 may be an acoustic microphone. Ambient microphone 160 may be a condenser microphone, a dynamic microphone, or a ribbon microphone. Ambient microphone 160 may be a directional microphone, a bidirectional microphone, or an omni-directional microphone. Ambient microphone 160 may be a stereo microphone. Ambient microphone 160 may be a cardioid microphone, a super-cardioid microphone, or a hyper-cardioid microphone. Ambient microphone 160 may be an ambisonic microphone. Ambient microphone 160 may be a B-format microphone, an A-format microphone, or a 4-channel microphone.

In at least some exemplary embodiments, apparatus 115 may be configured to be attached to instrument 105 such as a musical instrument to record it using a combination of a first microphone and a second microphone. For example, the first microphone may be a contact microphone that may be configured to capture the sound of the instrument, and the second microphone may be configured to capture the instrument in addition to any surrounding sounds such as other instruments, singing, and/or ambient sound. Having sound signals from both microphones may allow system 100 to computationally obtain a third audio signal (e.g., that of the other instruments, vocals, and ambient sound, which may be separate from the main instrument to which the device may be attached). For example, if a user such as a musician is singing and playing at the same time, system 100 may derive and isolate the singing audio from the instrument audio. System 100 may be used for music education, recording and mixing musical performances, noise isolation, and other audio applications. For example, apparatus 115 may be used to record near noisy machinery while the contact microphone signal may be used to suppress noise picked up by the ambient microphone.

In at least some exemplary embodiments, system 100 may be configured and/or utilized to organize sound data (e.g., a musical recordings library) using the exemplary disclosed module including an algorithm (e.g., a smart algorithm) that recognizes a song being played by a user (e.g., using instrument 105) and stores (e.g., files) it automatically in memory storage with similar tracks. This data organization may include notes of a music track, a name of the track, an artist, a genre, rhythm data, speed in bpm, length, chord progression, and/or lyrics of the track. System 100 may operate using the exemplary disclosed modules and algorithms for the purpose of recording and/or organizing a recordings library. The exemplary disclosed sound data organization may be performed using apparatus 115 and/or user device 110.

In at least some exemplary embodiments, system 100 may be configured to collect data over any desired period of time (e.g., an extended or long period of time) associated with playing (e.g., of instrument 105) of a user of system 100. For example, the collected data may be used to provide the user recommendations on what to practice, when to practice, motivational messages, graphs and visualizations on progress, suggestions of teachers for helping, and/or customized exercises to help them improve their skills. The exemplary disclosed machine learning operations may be used in providing the recommendations. Because the exemplary disclosed device (e.g., apparatus 115) may be attached to a user's instrument (e.g., instrument 105), the exemplary disclosed device may be configured to initiate operation (e.g., wake itself up from a low-power mode) in order to record sound produced by instrument 105 when a user begins to play and may selectively stop recording (e.g., when or as soon as the user puts instrument 105 aside). System 100 may thereby provide a data recording feature that may provide a substantially complete recording of the user's musical journey. The exemplary disclosed data collection may be performed using apparatus 115 and/or user device 110.

In at least some exemplary embodiments, system 100 may be configured to include wired and/or wireless connectivity to other devices via Wi-Fi and/or Bluetooth. For example, apparatus 115 may employ user interfaces such as, for example, buttons, touch surfaces, screens, touch screens, voice commands, and/or any other desired user interfaces. Data sensed for example by sensor 122 may be used to provide feedback, data, audio, video, and/or any other desired data to be recorded, viewed, and/or shared. For example, this data sharing feature may be useful to a user for sharing practice metrics with others. Also for example, such data may be used or shared to help give teachers a relatively deep insight into an amount and/or quality of playing a student may be doing, and/or help to allow a teacher's "in-person" time to be spent on teaching topics that may provide a demonstrable benefit to the student. For music bands or groups, system 100 (e.g., apparatus 115) may document whether or not members are meeting desired criteria (e.g., on the same page) for upcoming shows and/or indicate (e.g., clearly show) whether a particular song is ready for the stage based on collected data.

In at least some exemplary embodiments, system 100 (e.g., apparatus 115) may be used to send midi commands to other musical instruments or software. These midi commands may affect sound volumes, effects, play notes, accompaniment, and/or other parameters of other musical instruments or software. These midi commands may be sent wirelessly through Bluetooth, Wi-Fi, and/or any other exemplary disclosed communication techniques. Also, these midi commands may be controlled using user interface 400, sensor 122, user device 110, and/or any other suitable component of system 100.

In at least some exemplary embodiments, apparatus 115 may be configured and/or used to be releasably attached to instrument 105 via a mounting mechanism (e.g., attachment assembly 128). For example, the exemplary disclosed mounting mechanism may include a lock that may be selectively released to allow a mounting arm to expand and/or contract. Once the arm expands, the device may be fitted to a portion of instrument 105 by pressing and/or squeezing the arm (e.g., mounting arm 315, 320, or 325). For example, multiple lengths of arms may be provided to fit a width or thickness of any suitable instrument (e.g., instrument 105). For example, apparatus 115 may expand so that apparatus 115 may fit along a width or thickness of instrument 105, and the exemplary disclosed mounting arm may be replaced with a different size to allow it to fit on different-sized instruments.

In at least some exemplary embodiments, system 100 may provide a smart music tutor and recording tool. System 100 may teach a user to play and sing full songs and provide dynamic and instant feedback to the user on the user's progress. System 100 may easily record substantially all of a user's performances (e.g., in high quality) and/or help a user to organize the user's play and practice sessions for easy file access. System 100 may provide technical exercises and deep insight into a user's practice. System 100 may use note and lyrical information from a song a user is learning to compare the user's performance against the original piece.

Figure 9:
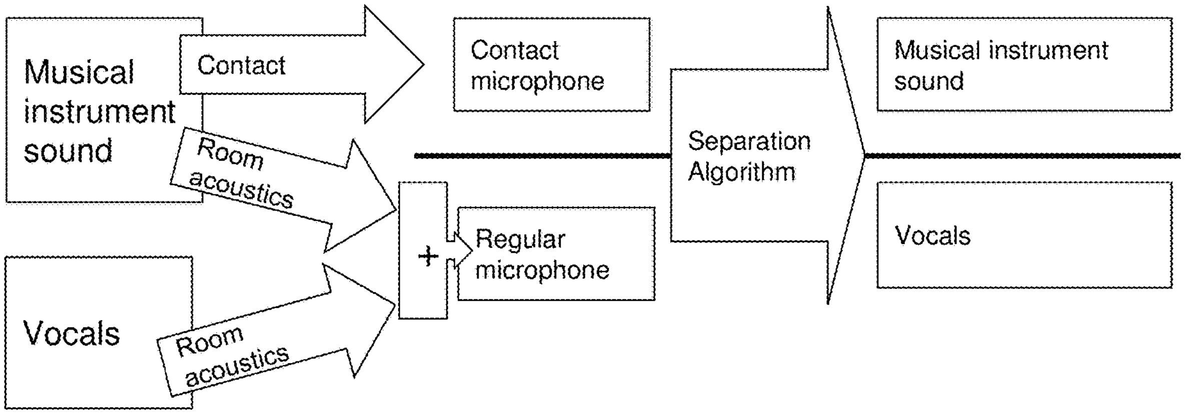
FIG. 9 provides a schematic illustration of at least some exemplary embodiments of the present disclosure.

The exemplary disclosed module may provide for an audio separation algorithm for example as illustrated in FIG. 9. Per the algorithm, contact microphone 150 may record (e.g., solely record) sound produced by instrument 105 to which contact microphone 150 is attached and contacts based on attachment of apparatus 115 to instrument 105. Ambient microphone 160 may record substantially all ambient sound (e.g., all ambient sound) including the sound of instrument 105, vocals, and/or any other ambient noise. System 100 may operate to subtract the instrument sound captured through the operation of contact microphone 150 from the recording of ambient microphone 160. The result may allow a user to listen to the sound produced from the user playing instrument 105 (e.g., a musical instrument) as a first track that is separate from the user's vocals and/or other ambient sounds. For example, system 100 may provide a first track of solely music produced by instrument 105, a second track of ambient sound including vocals without the sound of instrument 105, and a third track of all sound (e.g., music of instrument 105, vocals, and ambient noise).

Figure 10:
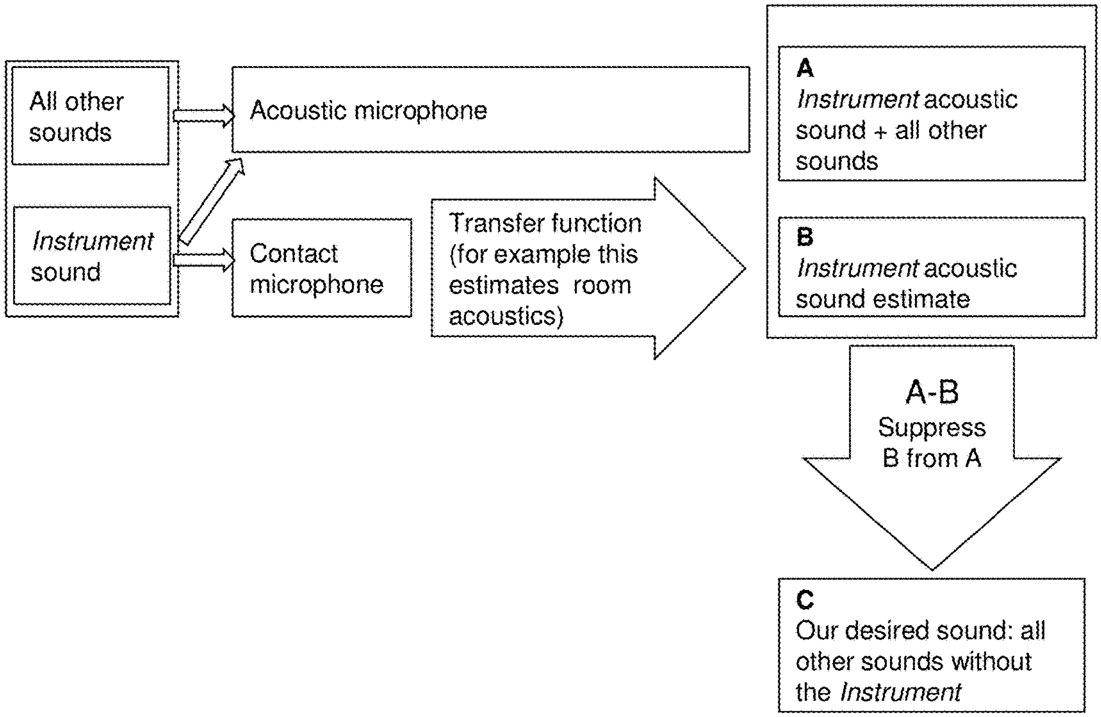
FIG. 10 provides a schematic illustration of at least some exemplary embodiments of the present disclosure.
Figure 11A:
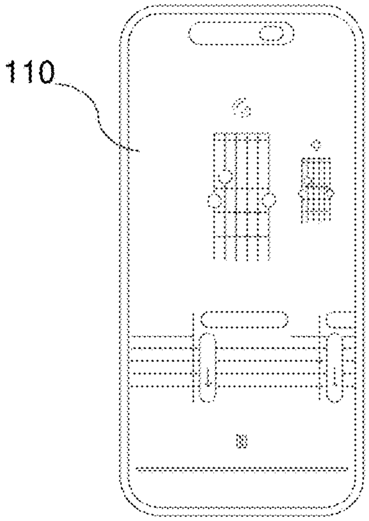
FIG. 11A illustrates a schematic view of at least some exemplary embodiments of the present disclosure.
Figure 11B:
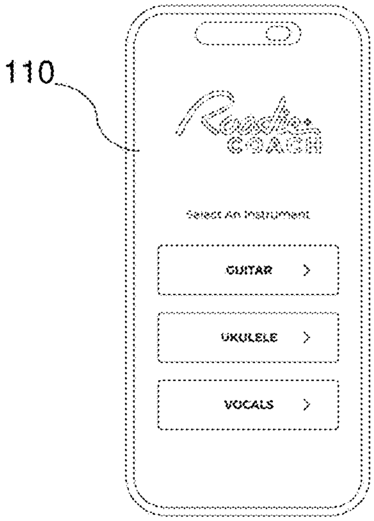
FIG. 11B illustrates a schematic view of at least some exemplary embodiments of the present disclosure.
Figure 11C:
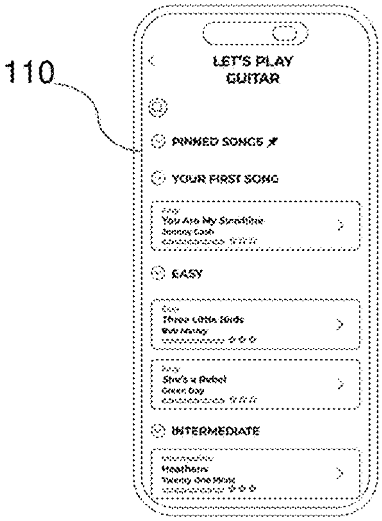
FIG. 11C illustrates a schematic view of at least some exemplary embodiments of the present disclosure.
Figure 11D:
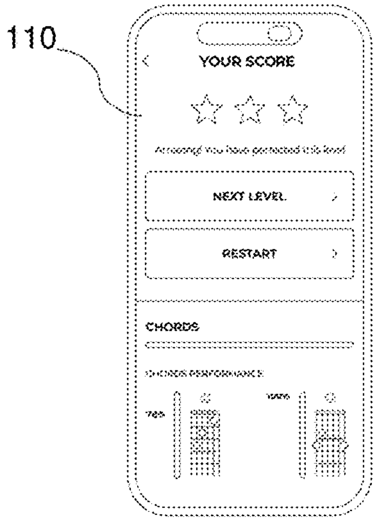
FIG. 11D illustrates a schematic view of at least some exemplary embodiments of the present disclosure.
Figure 11E:
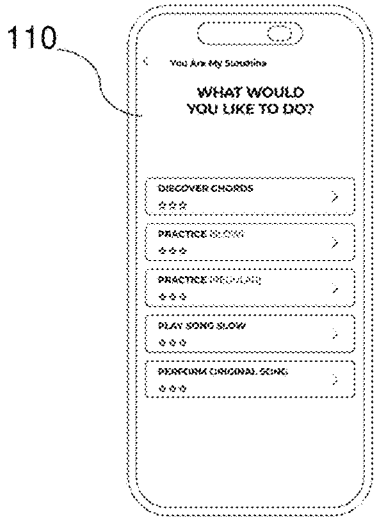
FIG. 11E illustrates a schematic view of at least some exemplary embodiments of the present disclosure.

FIG. 10 also illustrates aspects of the exemplary disclosed audio separation algorithm of the exemplary disclosed module. As illustrated in FIG. 10, system 100 may record audio via contact microphone 150 attached to instrument 105 and ambient microphone 160 that may be placed nearby (e.g., or be integrated with apparatus 115). Ambient microphone 160 may pick up substantially all sounds, including the sound of instrument 105 and other sounds (e.g., track "A"). Other sounds than the sound of instrument 105 included in track "A" may include singing or other instruments in the vicinity of ambient microphone 160.

System 100 may run instrument audio of instrument 105 that was captured by contact microphone 150 into a transfer function in order to estimate the sound of instrument 105 (track "B") that was captured by ambient microphone 160. The transfer function may be a band of filters in the frequency domain with each filter having a gain parameter that modifies the power of that frequency band. Some bands may be attenuated or amplified and the gain parameters may be adjusted accordingly. The gain parameters may be estimated offline by sweeping a frequency through the audible band (e.g., the entire audible band) in a silent environment to try to ensure that the instrument sound picked up by contact microphone 150 is the same instrument sound picked up by ambient microphone 160. Following that, computing the gain for each frequency band would be the division of the standard mic power of ambient microphone 160 in that band over the contact mic power of contact microphone 150 for that same band. Any other suitable technique may also be used to estimate the transfer function, including for example techniques utilizing the exemplary disclosed machine learning operations.

System 100 may suppress track "B" from track "A" to determine track "C" that may be a desired sound (e.g., A−B=C). For example, track "C" may be all sounds recorded by ambient microphone 160 without the sound of instrument 105 (e.g., corresponding to the sound recorded by contact microphone 150).

FIGS. 11A through 11E illustrate exemplary graphical displays on user device 110 including uses of system 100 for music education including instructions, playing instrument 105 interactively with apparatus 115, sharing results with other users (e.g., other musicians) or teachers, and receiving feedback on a performance of a user. FIGS. 11A through 11E also illustrate exemplary graphical displays on user device 110 associated with instrument choices, song choices, different levels for each song, specific tips on skill learning, and/or performance scores. The exemplary disclosed graphical displays may be associated with an operation of the exemplary disclosed modules. Insight data, graphs, and charts may be similarly displayed to users via user device 110.

The exemplary disclosed system, apparatus, and method may be used in any suitable application involving a sound-producing device. For example, the exemplary disclosed system, apparatus, and method may be used in any suitable application involving a musical instrument. The exemplary disclosed system, apparatus, and method may be used in any suitable application for recording sound such as music. The exemplary disclosed system, apparatus, and method may be used in any suitable application for recording, organizing, evaluating, and/or analyzing sound such as music and/or any other suitable sound. For example, the exemplary disclosed system, apparatus, and method may be used in any suitable application for music instruction and/or education.

Figure 12:
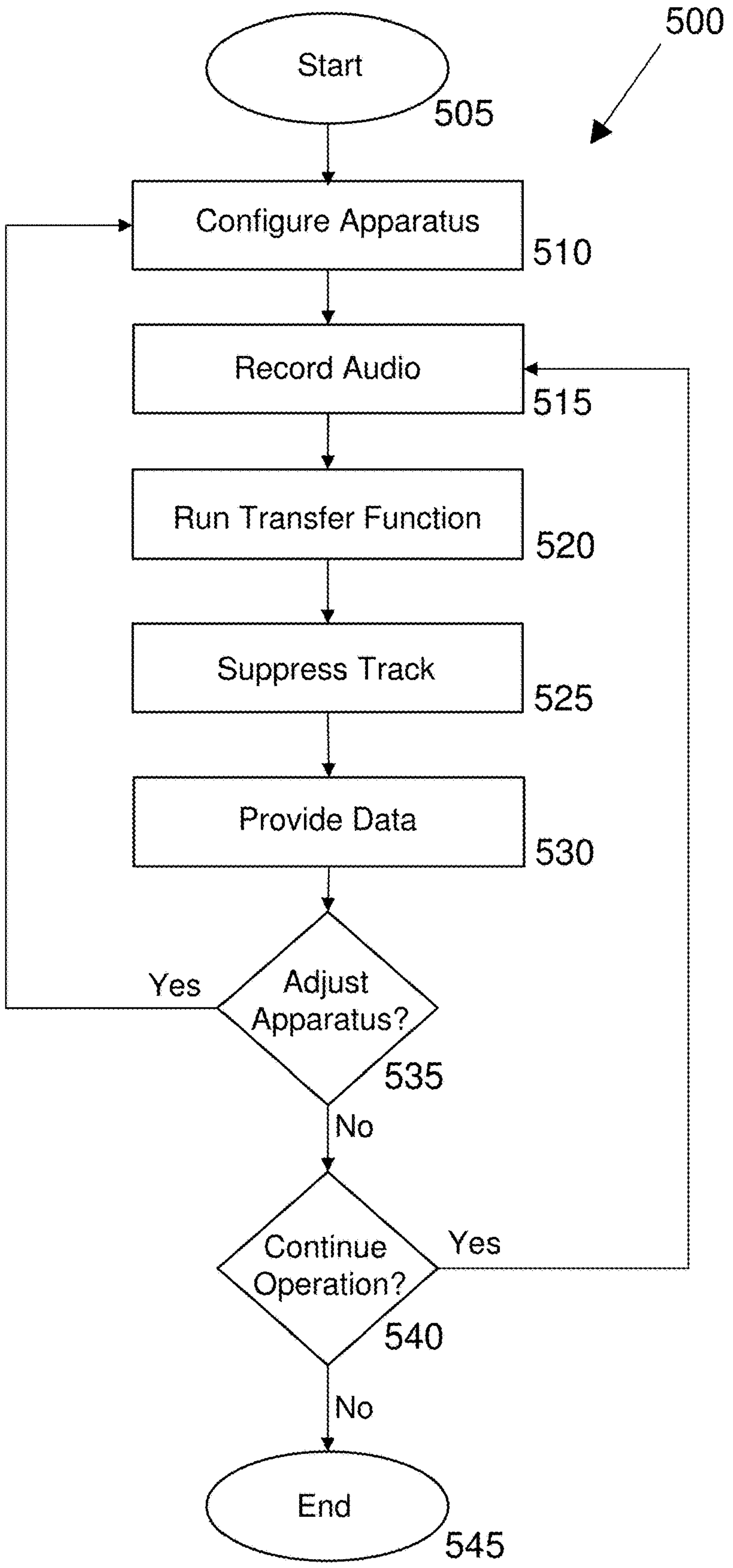
FIG. 12 illustrates an exemplary process of at least some exemplary embodiments of the present disclosure.

FIG. 12 illustrates an exemplary operation or algorithm of the exemplary disclosed system 100. Process 500 begins at step 505. At step 510, apparatus 115 may be configured. A user may removably attach apparatus 115 to instrument 105 as illustrated in FIG. 1 based on adjusting attachment assembly 128 as described above. For example, a user may apply force to mounting arm 315, 320, or 325 via gear assembly 330 and move lock assembly 335 to the locked position for example as illustrated in FIG. 6.

At step 515, system 100 may operate to record audio. Contact microphone 150 may record sound produced by instrument 105 (e.g., solely sound produced by instrument 105) to which contact microphone 150 is attached and contacts based on attachment of apparatus 115 to instrument 105 as described above. Ambient microphone 160 may record substantially all ambient sound (e.g., all ambient sound) including the sound of instrument 105, vocals, and/or any other ambient noise as described above.

At step 520, system 100 may operate to run the exemplary disclosed transfer function for example as described above regarding FIG. 10. At step 525, system 100 may operate to suppress tracks for example as described above regarding FIG. 10. For example, system 100 may operate to suppress track "B" from track "A" to determine track "C" for example as described above regarding FIG. 10.

At step 530, system 100 may operate to transfer data associated with the recorded sound data, results data, user input data, data sensed by one or more sensors 122, and/or analysis data regarding a user's performance (e.g., producing sound with instrument 105 and/or other sounds such as vocals). System 100 may transfer data between apparatus 115, user device 110, instrument 105, and/or sensor 122 using the exemplary disclosed communication techniques. System 100 may display output data and/or receive user input data via user interface 400, user device 110, and/or any other suitable component of system 100.

At step 535, system 100 may determine whether or not to reconfigure apparatus 115 and/or instruct a user to reconfigure apparatus 115 for more effective operation based on user manipulation (e.g., turning off apparatus 115 based on actuation of power control 210), displaying output or instructions to the user via user interface 400 and/or user device 110, machine learning operations, algorithms of the exemplary disclosed module, a predetermined time period, and/or any other suitable criteria. If apparatus 115 is to be reconfigured, process 500 returns to step 510. If apparatus 115 is not to be reconfigured, process 500 proceeds to step 540.

At step 540, system 100 may determine whether or not to continue operation based on user manipulation (e.g., turning off apparatus 115 based on actuation of power control 210), machine learning operations, algorithms of the exemplary disclosed module, a predetermined time period, and/or any other suitable criteria. If operation is to be continued, process 500 returns to step 515. If operation is to stop, process 500 may end at step 545.

In at least some exemplary embodiments, the exemplary disclosed apparatus may be a recording device that attaches to a first musical instrument and that includes a contact microphone that is in direct contact with the instrument and that may pick up solely the sound of the first instrument, a regular microphone that may pick up the ambient sound that may include the sound of the first instrument, and/or one or more other instruments (e.g., such as singing or other instruments playing in the same room). The recording device may also include a mechanism that allows the device to releasably couple to the musical instrument and that allows the contact microphone to be in physical contact with the instrument allowing desired propagation of instrument sound vibrations, and a memory storage to store the recordings of both microphones and an interface to allow users to access and download those recordings. The recording device may further include a battery that powers the electronics of the device, and a processing unit that runs algorithms to remove the signal of the contact microphone from that of the regular microphone to allow the device to retrieve vocal recordings without instrument sound. The recording device may further include a user interface that allows users to adjust the recording settings and receive feedback on the status of the device such as selecting the number of channels to be recorded (e.g., mono or stereo), turning recording ON/OFF, adjusting the gain of each channel, seeing the sound level meters (e.g., VU meters), adjusting the sampling rate and/or bitrate of the recording, and choosing an audio compression algorithm. The recording device may further include a playback functionality that allows the users to play their recordings and listen to them through a built-in speaker or through an external playback device. The recording device may also include a line-in jack that may be used to record the input from external microphones or electric instruments (e.g., an electric guitar or electric bass). The recording device may further include data connectivity (e.g., Wi-Fi or cellular) to a cloud storage server allowing users to upload their recordings, store them on the cloud, and access them anytime and from any device. The recording device may also include a processing unit that may apply different real-time effects (e.g., EQ, Reverb, and/or Fading) to the different microphone tracks. The recording device may be a smart device that automatically recognizes a song recording by using fingerprint information and comparing this fingerprint to a database of songs effectively allowing it to recognize the title, artist, and other information. The smart recording device may allow users to group and/or organize songs by attributes such as artist, genre, key, and tempo. The recording device may be a smart device that comprises an algorithm that simplifies the user's file management by automatically grouping recordings that are similar using fingerprint information and comparing this fingerprint to a database of songs. The recording device may be a smart device that can automatically split a long recording into a set of smaller ones by looking into musical cues such as pauses and changes to the genre, tempo, and key to effectively trim and split long recordings. The circuit and the processing unit may go into a low power sleep mode and may wake up and start recording upon detection of a specific cue (e.g., instrument 105 being played). The cue may be the particular sound of an instrument. The processing unit may analyze the sound and determine whether it is an instrument sound or noise and determine accordingly whether to go back into low power mode or not. The cue may include voice commands instructing the device to activate certain features (e.g., recording, playback, etc.).

The exemplary disclosed device may be a music training device that attaches to a musical instrument. The music training device that attaches to the musical instrument may include a contact microphone that is in direct contact with the instrument and that may pick up solely the sound of the instrument, a regular microphone that may pick up the ambient sound and that may be used to record vocals, a mechanism that may allow the device to couple to the musical instrument and that may allow the contact microphone to be in physical contact with the instrument to allow desired propagation of instrument sound vibrations, a memory storage to store the recordings of both microphones, a battery that provides hours of recording on a single charge, and a processing unit that runs algorithms to remove the signal of the contact microphone from that of the regular microphone to effectively allow the device to retrieve vocal recordings without instrument sound. The exemplary disclosed recording device may connect via Bluetooth or Wi-Fi to a mobile application and stream audio effectively (e.g., acting as a Bluetooth or Wi-Fi microphone capable of transmitting both contact and regular microphone signals at the same time). The exemplary disclosed recording device may keep track of a user's practice time and allow the user to keep track of the user's music practice routine. The exemplary disclosed recording device may include a mobile application that contains a selection of songs of varying difficulty levels for the user to learn. The mobile application may provide immediate visual feedback on whether the users have played parts of the song correctly or not, and/or highlight mistakes and propose exercises to allow them to improve their performance. The exemplary disclosed system may provide users with a score at the end of each level and/or a detailed report explaining the score. This feedback may be created by the system by comparing the user's performance to an ideal reference track. The application may provide feedback on both the instrument performance and singing at the same time. Users may be provided with long-term feedback on the trends of their performances, their preferences, and/or the progress they have made in the app over a period of time. Badges may be awarded by the system for completing specific actions. The app may also operate to recommend relevant content customized to each user. Users may compete with each other based on their progress in the app over a period of time. This "Progress" may be composed of data indicating how consistently users practice and how well users perform a song. A report on a user's performance and/or the actual recording of a song can be sent to the user's teacher for further evaluation (e.g., so that the teacher has more data points that help them teach more effectively). Users may collaborate when each user has an exemplary disclosed recording device and each user is playing a song from the app's music library. The app may operate to single out mistakes made by individuals in the group, as well as sync the recordings from multiple devices together.

In at least some exemplary embodiments, the exemplary disclosed apparatus may be an apparatus for recording sound of an instrument. The exemplary disclosed apparatus may include a contact microphone (e.g., contact microphone 150) configured to contact the instrument, an ambient microphone (e.g., ambient microphone 160), and a controller (e.g., controller 410). The ambient microphone may be configured to record ambient sound at a location of the instrument as a first signal or data. The contact microphone may be insensitive to air vibrations and may be configured to record vibrations of the instrument as a second signal or data. The controller may be configured to determine a sound track based on suppressing the second signal or data from the first signal or data. The exemplary disclosed apparatus may also include a housing at which the controller and the ambient microphone may be disposed, and an attachment assembly attached to the housing, the contact microphone being disposed at the attachment assembly. The attachment assembly may include an attachment arm and a movable mounting arm that is movable relative to the attachment arm, the contact microphone being disposed at the attachment arm. The exemplary disclosed apparatus may further include a memory storage configured to store recordings of the contact microphone and the ambient microphone, and a user interface or a user device that may be configured to allow users to access and download the recordings. The user interface or the user device may be configured to allow users to perform at least one selected from the group of adjusting recording settings and receiving feedback on a status of the apparatus including selecting a number of channels to be recorded, turning channels, recording on and off times, adjusting a gain of each channel, displaying sound level meters, adjusting a sampling rate or a bitrate of recordings, choosing an audio compression algorithm, and combinations thereof. The controller may be configured to provide a playback functionality that allows recordings to be played and listened to via a built-in speaker of the apparatus or via an external playback jack or device of the apparatus. The exemplary disclosed apparatus may also include a line-in jack configured to connect one or more external devices to the controller and to record input from the one or more external devices, the one or more external devices including at least one selected from the group of an external microphone, an electric musical instrument, and combinations thereof. The controller may be configured to connect to a cloud storage server providing at least one selected from the group of user upload of user recordings, user storage of the user recordings on the cloud storage server, user access of the user recordings on the cloud storage server, and combinations thereof. The sound track may include vocal recordings of a user without the sound of the instrument.

In at least some exemplary embodiments, the exemplary disclosed method may be a method for recording sound of an instrument. The exemplary disclosed method may include recording ambient sound at a location of the instrument as a first signal or data using an ambient microphone (e.g., ambient microphone 160), contacting the instrument with a contact microphone (e.g., contact microphone 150) that may be insensitive to air vibrations, recording vibrations of the instrument as a second signal or data using the contact microphone contacting the instrument while recording the ambient sound using the ambient microphone, and determining a sound track based on suppressing the second signal or data from the first signal or data using a controller (e.g., controller 410). The exemplary disclosed method may also include applying real-time effects to at least one of the sound track, the first signal or data, or the second signal or data, the real-time effects including at least one selected from the group of EQ, Reverb, Fading, and combinations thereof. The exemplary disclosed method may further include identifying a song recording from fingerprint information based on the first signal or data or the second signal or data, and comparing the fingerprint information to a database of songs to identify a song title or song artist. The exemplary disclosed method may also include using the fingerprint information to group a plurality of identified songs by at least one selected from the group of artist, genre, key, tempo, and combinations thereof. The exemplary disclosed method may further include splitting a long recording based on at least one of the first or second signal or data into a plurality of shorter recordings based on musical cues of the long recording. The exemplary disclosed method may also include maintaining the controller in a low power sleep mode until waking up the controller into an operating mode based on detecting a sound cue, and operating the ambient microphone and the contact microphone after waking up the controller. The exemplary disclosed method may further include, after waking up the controller, determining whether or not the sound cue is the sound of the instrument, and returning the controller to the low power sleep mode based on whether or not the sound cue is the sound of the instrument. The sound cue may be at least one selected from the group of a voice command, gyroscope data, accelerometer data, and combinations thereof. The exemplary disclosed method may further include simultaneously streaming the first and second signal or data to an external device or a network using the controller. The exemplary disclosed method may also include analyzing user data based on the first and second signal or data, the analyzed user data including at least one selected from the group of user practice time, data of whether or not songs are correctly played, data of recommended user exercises, performance score data, performance data for simultaneous user instrument performance and singing, long-term feedback data regarding trends of user performance, and combinations thereof. The exemplary disclosed method may further include providing output badge data based on the analyzed user data, comparing analyzed user data of a plurality of users, displaying the compared analyzed user data to the plurality of users, and transferring at least one of the analyzed user data and the compared analyzed user data to teachers of the plurality of users.

In at least some exemplary embodiments, the exemplary disclosed apparatus may be an apparatus for recording sound of a musical instrument. The exemplary disclosed apparatus may include a housing, a controller (e.g., controller 410) disposed in the housing, an attachment assembly attached to the housing and configured to removably attach the housing to the musical instrument, a contact microphone (e.g., contact microphone 150) disposed at the attachment assembly and configured to contact the musical instrument; and an ambient microphone (e.g., ambient microphone 160) disposed at the housing. The ambient microphone may be configured to record ambient sound at a location of the musical instrument as a first signal or data. The contact microphone may be insensitive to air vibrations and may be configured to record vibrations of the musical instrument as a second signal or data. The controller may be configured to determine a sound track based on suppressing the second signal or data from the first signal or data.

The exemplary disclosed system, apparatus, and method may provide an efficient and effective technique for evaluating sound produced by an individual device in a relatively noisy environment. For example, the exemplary disclosed system, apparatus, and method may provide an efficient and effective technique for tuning a musical instrument in a relatively noisy environment. The exemplary disclosed system, apparatus, and method may also provide for evaluating sound produced by an individual device when used in conjunction with other sound-producing devices.

Figure 13:
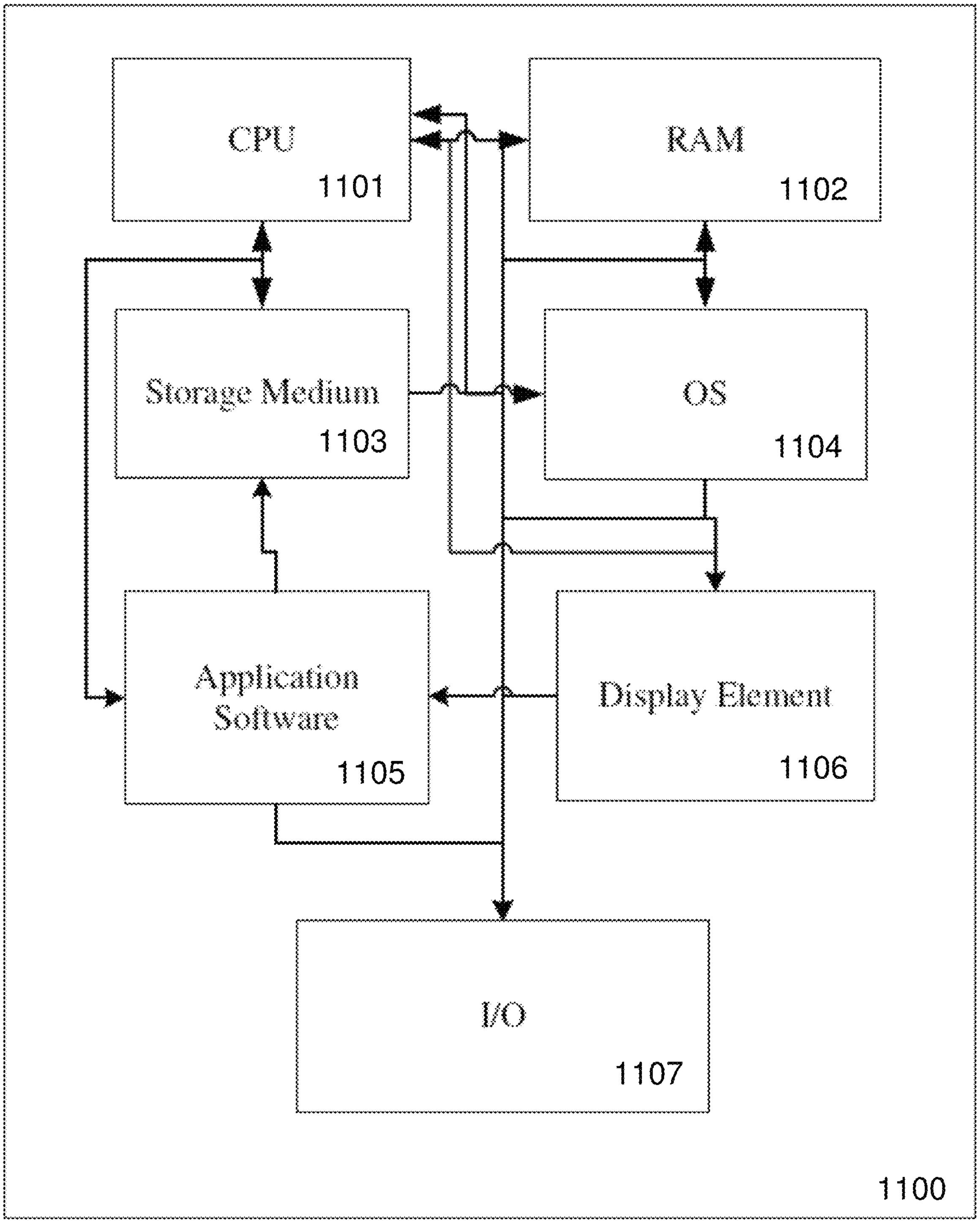
FIG. 13 is a schematic illustration of an exemplary computing device, in accordance with at least some exemplary embodiments of the present disclosure.

An illustrative representation of a computing device appropriate for use with embodiments of the system of the present disclosure is shown in FIG. 13. The computing device 1100 can generally be comprised of a Central Processing Unit (CPU, 1101), optional further processing units including a graphics processing unit (GPU), a Random Access Memory (RAM, 1102), a mother board 1103, or alternatively/additionally a storage medium (e.g., hard disk drive, solid state drive, flash memory, cloud storage), an operating system (OS, 1104), one or more application software 1105, a display element 1106, and one or more input/output devices/means 1107, including one or more communication interfaces (e.g., RS232, Ethernet, Wi-Fi, Bluetooth, USB). Useful examples include, but are not limited to, personal computers, smart phones, laptops, mobile computing devices, tablet PCs, touch boards, and servers. Multiple computing devices can be operably linked to form a computer network in a manner as to distribute and share one or more resources, such as clustered computing devices and server banks/farms.

Various examples of such general-purpose multi-unit computer networks suitable for embodiments of the disclosure, their typical configuration and many standardized communication links are well known to one skilled in the art, as explained in more detail and illustrated by FIG. 14, which is discussed herein-below.

According to an exemplary embodiment of the present disclosure, data may be transferred to the system, stored by the system and/or transferred by the system to users of the system across local area networks (LANs) (e.g., office networks, home networks) or wide area networks (WANs) (e.g., the Internet). In accordance with the previous embodiment, the system may be comprised of numerous servers communicatively connected across one or more LANs and/or WANs. One of ordinary skill in the art would appreciate that there are numerous manners in which the system could be configured and embodiments of the present disclosure are contemplated for use with any configuration.

In general, the system and methods provided herein may be employed by a user of a computing device whether connected to a network or not. Similarly, some steps of the methods provided herein may be performed by components and modules of the system whether connected or not. While such components/modules are offline, and the data they generated will then be transmitted to the relevant other parts of the system once the offline component/module comes again online with the rest of the network (or a relevant part thereof). According to an embodiment of the present disclosure, some of the applications of the present disclosure may not be accessible when not connected to a network, however a user or a module/component of the system itself may be able to compose data offline from the remainder of the system that will be consumed by the system or its other components when the user/offline system component or module is later connected to the system network.

Figure 14:
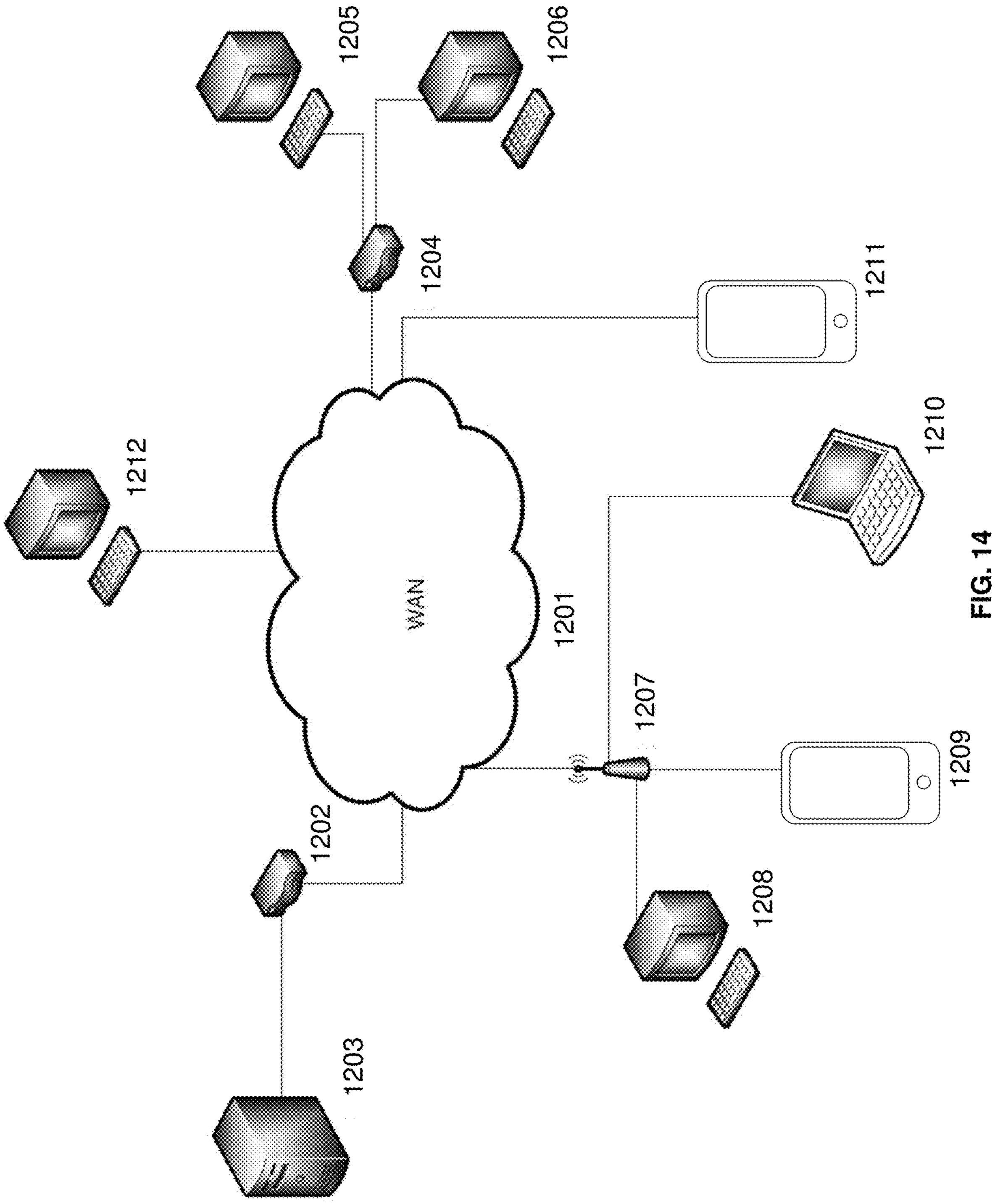
FIG. 14 is a schematic illustration of an exemplary network, in accordance with at least some exemplary embodiments of the present disclosure.

Referring to FIG. 14, a schematic overview of a system in accordance with an embodiment of the present disclosure is shown. The system is comprised of one or more application servers 1203 for electronically storing information used by the system. Applications in the server 1203 may retrieve and manipulate information in storage devices and exchange information through a WAN 1201 (e.g., the Internet). Applications in server 1203 may also be used to manipulate information stored remotely and process and analyze data stored remotely across a WAN 1201 (e.g., the Internet).

According to an exemplary embodiment, as shown in FIG. 14, exchange of information through the WAN 1201 or other network may occur through one or more high speed connections. In some cases, high speed connections may be over-the-air (OTA), passed through networked systems, directly connected to one or more WANs 1201 or directed through one or more routers 1202. Router(s) 1202 are completely optional and other embodiments in accordance with the present disclosure may or may not utilize one or more routers 1202. One of ordinary skill in the art would appreciate that there are numerous ways server 1203 may connect to WAN 1201 for the exchange of information, and embodiments of the present disclosure are contemplated for use with any method for connecting to networks for the purpose of exchanging information. Further, while this application refers to high speed connections, embodiments of the present disclosure may be utilized with connections of any speed.

Components or modules of the system may connect to server 1203 via WAN 1201 or other network in numerous ways. For instance, a component or module may connect to the system i) through a computing device 1212 directly connected to the WAN 1201, ii) through a computing device 1205, 1206 connected to the WAN 1201 through a routing device 1204, iii) through a computing device 1208, 1209, 1210 connected to a wireless access point 1207 or iv) through a computing device 1211 via a wireless connection (e.g., CDMA, GSM, 3G, 4G) to the WAN 1201. One of ordinary skill in the art will appreciate that there are numerous ways that a component or module may connect to server 1203 via WAN 1201 or other network, and embodiments of the present disclosure are contemplated for use with any method for connecting to server 1203 via WAN 1201 or other network. Furthermore, server 1203 could be comprised of a personal computing device, such as a smartphone, acting as a host for other computing devices to connect to.

The communications means of the system may be any means for communicating data, including text, binary data, image and video, over one or more networks or to one or more peripheral devices attached to the system, or to a system module or component. Appropriate communications means may include, but are not limited to, wireless connections, wired connections, cellular connections, data port connections, Bluetooth® connections, near field communications (NFC) connections, or any combination thereof. One of ordinary skill in the art will appreciate that there are numerous communications means that may be utilized with embodiments of the present disclosure, and embodiments of the present disclosure are contemplated for use with any communications means.

The exemplary disclosed system may for example utilize collected data to prepare and submit datasets and variables to cloud computing clusters and/or other analytical tools (e.g., predictive analytical tools) which may analyze such data using artificial intelligence neural networks. The exemplary disclosed system may for example include cloud computing clusters performing predictive analysis. For example, the exemplary disclosed system may utilize neural network-based artificial intelligence to predictively assess risk. For example, the exemplary neural network may include a plurality of input nodes that may be interconnected and/or networked with a plurality of additional and/or other processing nodes to determine a predicted result (e.g., a location as described for example herein).

For example, exemplary artificial intelligence processes may include filtering and processing datasets, processing to simplify datasets by statistically eliminating irrelevant, invariant or superfluous variables or creating new variables which are an amalgamation of a set of underlying variables, and/or processing for splitting datasets into train, test and validate datasets using at least a stratified sampling technique. For example, the prediction algorithms and approach may include regression models, tree-based approaches, logistic regression, Bayesian methods, deep-learning and neural networks both as a stand-alone and on an ensemble basis, and final prediction may be based on the model/structure which delivers the highest degree of accuracy and stability as judged by implementation against the test and validate datasets. Also for example, exemplary artificial intelligence processes may include processing for training a machine learning model to make predictions based on data collected by the exemplary disclosed sensors.

Traditionally, a computer program includes a finite sequence of computational instructions or program instructions. It will be appreciated that a programmable apparatus or computing device can receive such a computer program and, by processing the computational instructions thereof, produce a technical effect.

A programmable apparatus or computing device includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computing device can include any and all suitable combinations of at least one general purpose computer, special-purpose computer, programmable data processing apparatus, processor, processor architecture, and so on. It will be understood that a computing device can include a computer-readable storage medium and that this medium may be internal or external, removable and replaceable, or fixed. It will also be understood that a computing device can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the disclosure as claimed herein could include an optical computer, quantum computer, analog computer, or the like.

Regardless of the type of computer program or computing device involved, a computer program can be loaded onto a computing device to produce a particular machine that can perform any and all of the depicted functions. This particular machine (or networked configuration thereof) provides a technique for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Illustrative examples of the computer readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A data store may be comprised of one or more of a database, file storage system, relational data storage system or any other data system or structure configured to store data. The data store may be a relational database, working in conjunction with a relational database management system (RDBMS) for receiving, processing and storing data. A data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software components or modules, or as components or modules that employ external routines, code, services, and so forth, or any combination of these. All such implementations are within the scope of the present disclosure. In view of the foregoing, it will be appreciated that elements of the block diagrams and flowchart illustrations support combinations of means for performing the specified functions, combinations of steps for performing the specified functions, program instruction technique for performing the specified functions, and so on.

It will be appreciated that computer program instructions may include computer executable code. A variety of languages for expressing computer program instructions are possible, including without limitation Kotlin, Swift, C#, PHP, C, C++, Assembler, Java, HTML, JavaScript, CSS, and so on. Such languages may include assembly languages, hardware description languages, database programming languages, functional programming languages, imperative programming languages, and so on. In some embodiments, computer program instructions can be stored, compiled, or interpreted to run on a computing device, a programmable data processing apparatus, a heterogeneous combination of processors or processor architectures, and so on. Without limitation, embodiments of the system as described herein can take the form of mobile applications, firmware for monitoring devices, web-based computer software, and so on, which includes client/server software, software-as-a-service, peer-to-peer software, or the like.

In some embodiments, a computing device enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computing device can process these threads based on priority or any other order based on instructions provided in the program code.

Unless explicitly stated or otherwise clear from the context, the verbs "process" and "execute" are used interchangeably to indicate execute, process, interpret, compile, assemble, link, load, any and all combinations of the foregoing, or the like. Therefore, embodiments that process computer program instructions, computer-executable code, or the like can suitably act upon the instructions or code in any and all of the ways just described.

The functions and operations presented herein are not inherently related to any particular computing device or other apparatus. Various general-purpose systems may also be used with programs in accordance with the teachings herein, or it may prove convenient to construct more specialized apparatus to perform the required method steps. The required structure for a variety of these systems will be apparent to those of ordinary skill in the art, along with equivalent variations. In addition, embodiments of the disclosure are not described with reference to any particular programming language. It is appreciated that a variety of programming languages may be used to implement the present teachings as described herein, and any references to specific languages are provided for disclosure of enablement and best mode of embodiments of the disclosure. Embodiments of the disclosure are well suited to a wide variety of computer network systems over numerous topologies. Within this field, the configuration and management of large networks include storage devices and computing devices that are communicatively coupled to dissimilar computing and storage devices over a network, such as the Internet, also referred to as "web" or "world wide web".

Throughout this disclosure and elsewhere, block diagrams and flowchart illustrations depict methods, apparatuses (e.g., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware and computer instructions; and so on—any and all of which may be generally referred to herein as a "component", "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present disclosure are contemplated for use with any language.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments.

It will be apparent to those skilled in the art that various modifications and variations can be made to the disclosed system and method. Other embodiments will be apparent to those skilled in the art from consideration of the specification and practice of the disclosed method and apparatus. It is intended that the specification and examples be considered as exemplary only, with a true scope being indicated by the following claims.

What is claimed is:

1. An apparatus for recording sound of a musical instrument, comprising:
- a housing;
- a controller disposed in the housing;
- an attachment assembly attached to the housing and configured to removably attach the housing to the musical instrument;
- a contact microphone disposed at the attachment assembly and configured to contact the musical instrument; and
- an ambient microphone disposed at the housing.

2. The apparatus of claim 1, wherein the controller is configured to determine a sound track based on suppressing the second signal or data from the first signal or data.

3. The apparatus of claim 1, wherein the attachment assembly includes an attachment arm and a movable mounting arm that is movable relative to the attachment arm, the contact microphone being disposed at the attachment arm.

4. The apparatus of claim 1, further comprising a memory storage configured to store recordings of the contact microphone and the ambient microphone, and a user interface or a user device that is configured to allow users to access and download the recordings.

5. The apparatus of claim 4, wherein the user interface or the user device is configured to allow users to perform at least one selected from the group of adjusting recording settings and receiving feedback on a status of the apparatus including selecting a number of channels to be recorded, turning recording on and off, adjusting a gain of each channel, displaying sound level meters, adjusting a sampling rate of recordings, choosing an audio compression algorithm, and combinations thereof.

6. The apparatus of claim 1, wherein the controller is configured to provide a playback functionality or a real-time playing functionality that allows recordings to be played and listened to via a built-in speaker of the apparatus or via an external playback jack or device of the apparatus.

7. The apparatus of claim 1, further comprising a line-in jack configured to connect one or more external devices to the controller and to record input from the one or more external devices, the one or more external devices including at least one selected from the group of an external microphone, an electric musical instrument, and combinations thereof.

8. The apparatus of claim 1, wherein the controller is configured to connect to a cloud storage server providing at least one selected from the group of user upload of user recordings, user storage of the user recordings on the cloud storage server, user access of the user recordings on the cloud storage server, and combinations thereof.

9. The apparatus of claim 2, wherein the sound track includes vocal recordings of a user without the sound of the instrument.

10. A method for recording sound of an instrument, comprising:

recording ambient sound at a location of the instrument as a first signal or data using an ambient microphone;

contacting the instrument with a contact microphone that is insensitive to air vibrations;

recording vibrations of the instrument as a second signal or data using the contact microphone contacting the instrument while recording the ambient sound using the ambient microphone;

determining a sound track based on suppressing the second signal or data from the first signal or data using a controller;

maintaining the controller in a low power sleep mode until waking up the controller into an operating mode based on detecting a sound cue; and operating the ambient microphone and the contact microphone after waking up the controller.

11. The method of claim 10, further comprising applying real-time effects to at least one of the sound track, the first signal or data, or the second signal or data, the real-time effects including at least one selected from the group of EQ, Reverb, Fading, and combinations thereof.

12. The method of claim 10, further comprising identifying a song recording from fingerprint information based on the first signal or data or the second signal or data, and comparing the fingerprint information to a database of songs to identify a song title or song artist.

13. The method of claim 12, further comprising using the fingerprint information to group a plurality of identified songs by at least one selected from the group of artist, genre, instrument, key, tempo, and combinations thereof.

14. The method of claim 10, further comprising splitting a long recording based on at least one of the first or second signal or data into a plurality of shorter recordings based on musical cues of the long recording.

15. The method of claim 10, further comprising, after waking up the controller, determining whether or not the sound cue is the sound of the instrument, and returning the controller to the low power sleep mode based on whether or not the sound cue is the sound of the instrument.

16. The method of claim 10, wherein the sound cue is at least one selected from the group of a voice command, gyroscope data, accelerometer data, and combinations thereof.

17. The method of claim 10, further comprising simultaneously streaming the first and second signal or data to an external device or a network using the controller.

18. The method of claim 17, further comprising analyzing user data based on the first and second signal or data, the analyzed user data including at least one selected from the group of user practice time, data of whether or not songs are correctly played, data of recommended user exercises, performance score data, performance data for simultaneous user instrument performance and singing, long-term feedback data regarding trends of user performance, and combinations thereof.

19. The method of claim 18, further comprising providing output badge data based on the analyzed user data, comparing analyzed user data of a plurality of users, displaying the compared analyzed user data to the plurality of users, and transferring at least one of the analyzed user data and the compared analyzed user data to teachers of the plurality of users.

20. An apparatus for recording sound of a musical instrument, comprising:

a housing;

a controller disposed in the housing;

an attachment assembly attached to the housing and configured to removably attach the housing to the musical instrument;

a contact microphone disposed at the attachment assembly and configured to contact the musical instrument; and an ambient microphone disposed at the housing;

wherein the ambient microphone is configured to record ambient sound at a location of the musical instrument as a first signal or data;

wherein the contact microphone is insensitive to air vibrations and is configured to record vibrations of the musical instrument as a second signal or data; and wherein the controller is configured to determine a sound track based on suppressing the second signal or data from the first signal or data.

21. A method for recording sound of an instrument, comprising:

recording ambient sound at a location of the instrument as a first signal or data using an ambient microphone;

contacting the instrument with a contact microphone that is insensitive to air vibrations;

recording vibrations of the instrument as a second signal or data using the contact microphone contacting the instrument while recording the ambient sound using the ambient microphone;

determining a sound track based on suppressing the second signal or data from the first signal or data using a controller;

simultaneously streaming the first and second signal or data to an external device or a network using the controller; and analyzing user data based on the first and second signal or data, the analyzed user data including at least one selected from the group of user practice time, data of whether or not songs are correctly played, data of recommended user exercises, performance score data, performance data for simultaneous user instrument performance and singing, long-term feedback data regarding trends of user performance, and combinations thereof.

* * * * *